United States Patent [19]

Alamouti et al.

[11] Patent Number: 5,659,578
[45] Date of Patent: Aug. 19, 1997

[54] HIGH RATE REED-SOLOMON CONCATENATED TRELLIS CODED 16 STAR QAM SYSTEM FOR TRANSMISSION OF DATA OVER CELLULAR MOBILE RADIO

[75] Inventors: Siavash M. Alamouti; Andrew S. Wright, both of Vancouver; William D. Haymond, Surrey, all of Canada

[73] Assignee: AT&T Wireless Services, Inc., Kirkland, Wash.

[21] Appl. No.: 344,156

[22] Filed: Nov. 23, 1994

[51] Int. Cl.$^6$ .................................................. H04L 5/12
[52] U.S. Cl. ........................ 375/261; 375/265; 375/322; 375/341; 371/43.4
[58] Field of Search .................................... 375/261, 262, 375/265, 341, 268, 273, 298, 300, 302; 371/43–46; 332/145

[56] References Cited

U.S. PATENT DOCUMENTS

| | | | |
|---|---|---|---|
| 3,988,677 | 10/1976 | Fletcher et al. | 325/41 |
| 4,503,545 | 3/1985 | Bremer et al. | 375/34 |
| 4,571,549 | 2/1986 | Lods et al. | 332/16 R |
| 4,627,072 | 12/1986 | Ryu et al. | 375/14 |
| 4,788,696 | 11/1988 | Sakane et al. | 375/111 |

(List continued on next page.)

FOREIGN PATENT DOCUMENTS

| | | |
|---|---|---|
| 943027895 | 9/1994 | European Pat. Off. . |
| 9203656 | 12/1992 | WIPO . |

OTHER PUBLICATIONS

Hanzo, et al., "On QAM Speech Transmission Schemes for Microcellular Mobile PCNs", *Telecommunication Systems*, vol. 4, No. 5, pp. 495–510, Sep.–Oct. 1993.
Webb, et al., "Does 16–QAM Provide an Alternative to a Half–Rate GSM Speech Codec?", *IEEE*, pp. 511–516, 1991.
Webb, "Modulation Methods for PCNs: For optimal efficiency, macrocellular and microcellular personal communications systems may require different modulation schemes", *IEEE Communications Magazine*, pp. 90–95, Dec. 1992.
Zein, et al., "Optimum erasure threshold in Reed–Solomon coded differential 16 star–QAM modulation", *Electronics Letters*, vol. 29, No. 20, pp. 1746–1748, Sep. 30, 1993.

(List continued on next page.)

*Primary Examiner*—Stephen Chin
*Assistant Examiner*—Kevin Kim
*Attorney, Agent, or Firm*—Knobbe, Martens, Olson & Bear, LLP

[57] ABSTRACT

A cellular communication system provides for trellis encoding/decoding of a 16 Star QAM signal. The system includes a transmitter circuit and a receiver circuit. The transmitter circuit has a Reed-Solomon encoder, an outer interleaver circuit for spreading burst errors, a cyclic trellis encoder, an inner interleaver circuit for reducing channel memory, a 16 Star QAM mapper and a radio frequency transmitter. The receiver circuit has a radio frequency receiver, equalization and filtering circuitry and timing and synchronization recovery circuitry. The receiver also has an inner deinterleaver, a trellis decoder, an outer deinterleaver, and a Reed-Solomon decoder.

9 Claims, 15 Drawing Sheets

U.S. PATENT DOCUMENTS

| | | | |
|---|---|---|---|
| 4,817,116 | 3/1989 | Akaiwa et al. | 375/49 |
| 4,825,457 | 4/1989 | Lebowitz | 379/40 |
| 4,835,483 | 5/1989 | Matsuura | 329/50 |
| 4,882,737 | 11/1989 | Dzung | 375/15 |
| 4,888,778 | 12/1989 | Brechard et al. | 371/37.4 |
| 4,891,823 | 1/1990 | Cole | 375/25 |
| 4,899,367 | 2/1990 | Sampei | 375/39 |
| 4,905,255 | 2/1990 | Aalaei | 375/17 |
| 4,918,437 | 4/1990 | Jasinski et al. | 340/825.44 |
| 4,922,507 | 5/1990 | Simon et al. | 375/26 |
| 4,939,555 | 7/1990 | Calderbank et al. | 375/265 |
| 4,941,154 | 7/1990 | Wei | 375/39 |
| 4,945,549 | 7/1990 | Simon et al. | 375/53 |
| 4,965,536 | 10/1990 | Yoshida | 332/103 |
| 4,968,955 | 11/1990 | Yoshida et al. | 329/304 |
| 4,968,966 | 11/1990 | Jasinski et al. | 340/825.44 |
| 4,972,506 | 11/1990 | Uddenfeldt | 455/33 |
| 4,993,046 | 2/1991 | Saito et al. | 375/39 |
| 5,005,186 | 4/1991 | Aono et al. | 375/82 |
| 5,023,889 | 6/1991 | Divsalar et al. | 375/27 |
| 5,023,900 | 6/1991 | Tayloe et al. | 379/32 |
| 5,054,110 | 10/1991 | Comroe et al. | 455/33 |
| 5,057,786 | 10/1991 | Yoshikawa | 329/304 |
| 5,077,790 | 12/1991 | D'Amico et al. | 380/23 |
| 5,081,649 | 1/1992 | Kennard | 375/39 |
| 5,095,500 | 3/1992 | Tayloe et al. | 379/32 |
| 5,111,483 | 5/1992 | Serfaty | 375/94 |
| 5,113,401 | 5/1992 | Chevillat et al. | 371/43 |
| 5,113,411 | 5/1992 | Yoshida et al. | 375/13 |
| 5,114,644 | 5/1992 | Borth | 375/96 |
| 5,115,454 | 5/1992 | Kucar | 375/77 |
| 5,119,375 | 6/1992 | Paneth et al. | 370/95.1 |
| 5,119,401 | 6/1992 | Tsujimoto | 375/14 |
| 5,121,391 | 6/1992 | Paneth et al. | 370/95.1 |
| 5,128,967 | 7/1992 | Durkin et al. | 375/83 |
| 5,134,634 | 7/1992 | Yoshida | 375/80 |
| 5,140,615 | 8/1992 | Jasper et al. | 375/100 |
| 5,168,509 | 12/1992 | Nakamura et al. | 375/39 |
| 5,175,875 | 12/1992 | Yokoya et al. | 455/89 |
| 5,251,236 | 10/1993 | Brehmer et al. | 375/59 |
| 5,258,987 | 11/1993 | Wei | 371/43 |
| 5,263,033 | 11/1993 | Seshadri | 371/43 |
| 5,311,582 | 5/1994 | Chemmakesha et al. | 375/265 |
| 5,331,553 | 7/1994 | Chennakeshu et al. | 375/39 |
| 5,428,631 | 6/1995 | Zehavi . | |
| 5,475,716 | 12/1995 | Huang | 375/354 |

OTHER PUBLICATIONS

Liu, et al., "Error Probability for Digital Transmission Over Nonlinear Channels with Application to TCM", *IEEE*, pp. 1101–1110, No. 5, Sep. 1990.

Dimakis, et al., "Performance evaluation of concatenated coding schemes on multilevel QAM signalling in non–Gaussian products environment", *IEE Proceedings–I*, vol. 140, No. 4, pp. 269–276, Aug. 1993.

Eyuboglu, et al., "Advanced Modulation Techniques for V.Fast", *ETT*, vol. 4, No. 3, May–Jun. 1993.

Spenler, et al., "Differentially Coherent TC–PSK with Subset Dilation", *IEICE Transactions*, vol. E74, No. 8, pp. 2220–2229, Aug. 1991.

Eyuboglu, M. Vedat, Forney, G. David, Dong, Ping, Long Guozhu, "Advanced Modulation Techniques for V.Fast", European Transaction on Telecommunications, vol. 4, No. 3, May–Jun. 1993, pp. 243–256.

Dimakis, C.E., Prof. Kouris, S.S., Avramis, S.K., "Performance Evaluation of Concatenated Coding Schemes on Multilevel QAM Signalling in Non–Gaussian Products Environment", IEEE Proceedings–1, vol. 140, No. 4, Aug. 1993, pp. 269–276.

Zein, N.F. Clarkson, T.G., "Optimum Erasure Threshold in Reed–Solomon Coded Differential 16–Star–QAM Modulation", Electronics Letters, vol. 29, No. 20, Sep. 30, 1993, pp. 1746–1747.

Liu, Yow–Jong, Biglieri, Ezio, "Error Probability for Digital Transmission Over Nonlinear Channels with Application to TCM", IEEE Transactions on Information Theory, 36 (1990) Sep., No. 5.

Webb, W.T., Hanzo, L., Steele, R., "Bandwidth Efficient QAM Schemes for Rayleigh Fading Channels, IEE Proceedings–1", vol. 138, No. 3, Jun. 1991, pp. 169–175.

Spenler, Stephen J., Yongacoglu, Abbas, Falconer, David D., "Differentially Coherent TC–PSK with Subset Dilation", IEICE Transactions, vol. E 74, No. 8, Aug. 1991, pp. 2220–2229.

Ungerboeck, Gottfried, "Channel Coding with Multilevel/Phase Signals", IEEE Transactions on Information Theory, vol. IT–28, No. 1, Jan. 1982, pp. 55–66.

Vucetic, B. and Du Jun, "Performance Bounds and New 16–QAM Trellis Codes for Fading Channels", pp. 353–363, Coded Modulation and Bandwith–Efficient Transmission, Biglieri, Luise, M.

Haccoun, et al., Digital Communications by Satellite, 7.8 "Reception of Binary Data Using Different Signaling Techniques" pp. 550–562.

Haccoun, et al., Digital Communications by Satellite, 7.8 "M–ARY Data Transmission Systems" pp. 569–574.

Webb, W.T. "Modulation Methods for PCN's", IEEE Communications Magazine, Dec. 1992, pp. 90–95.

Chow, Y.C., Nix, A.R., and McGeehan, J.P., "Analysis of 16–APSK Modulation in AWGN and Rayleigh Fading Channel", Electronics Letters, Vo. 28, No. 17, pp. 1608–1610, Aug. 12, 1992.

Jain, Yogendra, Convolutional Codes Improve Bit–Error Rate in Digital Systems, pp. 129–134, EDN, Aug. 20, 1990.

Viterbi, A.J., Wolf, J.K., Zehavi, E., and Padovani, R., "A Pragmatic Approach to Trellis–Coded Modulation", pp. 11–19, IEEE Communications Magazine, Jul. 1989.

Divsalar, D. and Simon, M.K., "The Design of Trellis Coded MPSK for Fading Channels: Performance Criteria", pp. 1004–1012, IEEE Transactions Communications, vol. 36, No. 9, Sep. 1988.

Ungerboeck, G., Trellis–Coded Modulation with Redundant Signal Sets Part 1:Introduction. pp. 5–11, IEEE Communications Magazine, vol. 25, No. 2, Feb. 1987.

Ungerboeck, G., Trellis–Coded Modulation with Redundant Signal Sets Part 2: State of the Art, pp. 12–21, IEEE Communications Magazine, vol. 25, No. 2, Feb. 1987.

Ungerboeck, G., "Channel Coding with Multilevel/Phase Signals", pp. 55–67, IEEE Communications Magazine, vol.–IT–28, No. 1, Jan. 1982.

Weber, W.J., III, "Differential Encoding for Multiple Amplitude and Phase Shift Keying Systems", pp. 385–391, IEEE Communications Magazine, vol. Com–26, No. 3, Mar. 1978.

Reudink, D.O., "Large–Scale Variations of the Average Signal", pp. 79–307, Microwave Mobile Communications, Jakes, W.C., Mobile Radio Propagation, Chapter 2, IEEE Press, 1974.

"Convolutional Encoding; Viterbi and Sequential Decoding", Chapter 12, pp. 353–443.

"Modems and Digital Modulation Techniques", Chapter 17, pp. 474–489, Digital Radio and Space Communication.

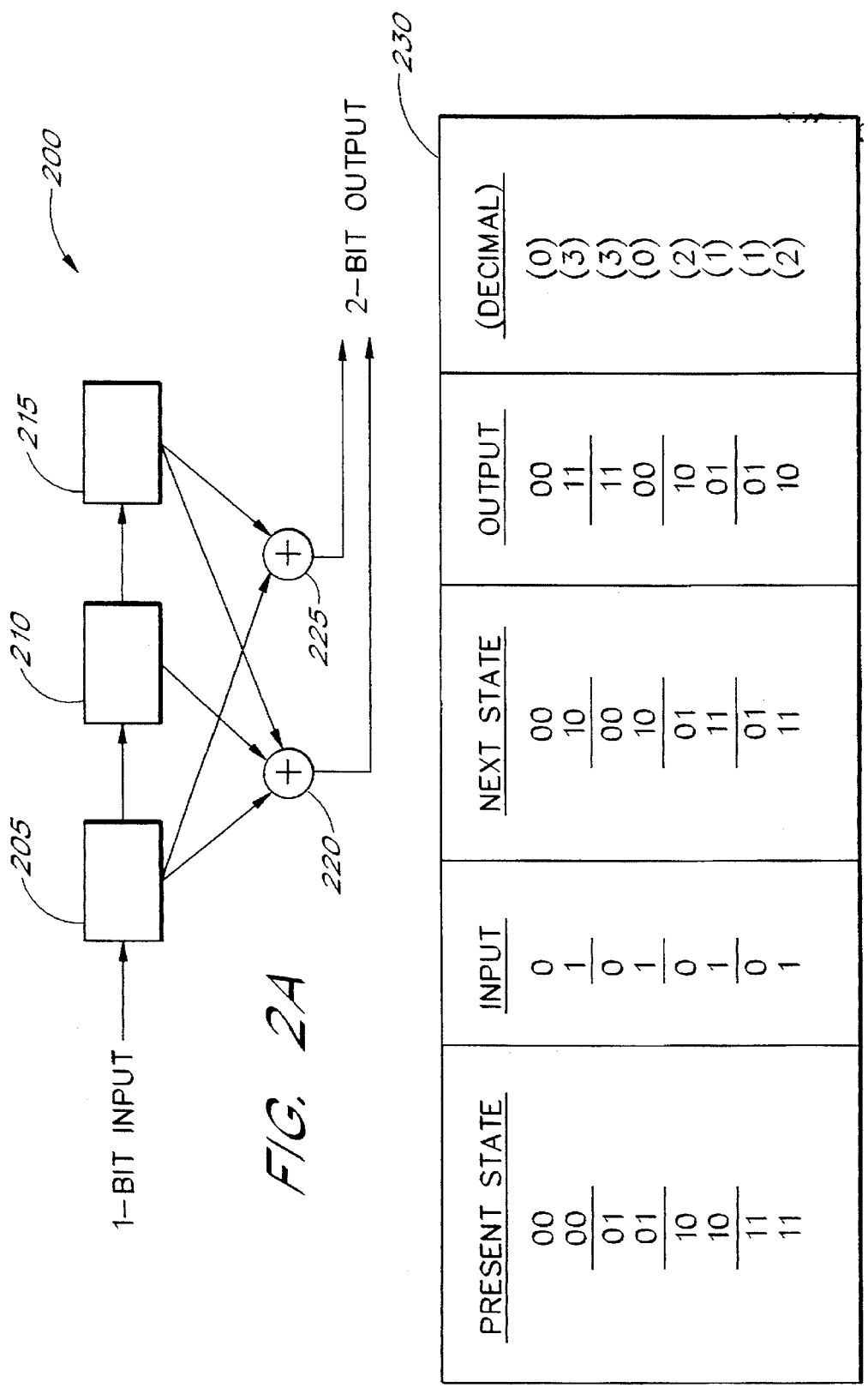

FIG. 6

INPUT

| Present State | 0 | 1 | 2 | 3 | 4 | 5 | 6 | 7 |
|---|---|---|---|---|---|---|---|---|
| 0 | 0 | 2 | 4 | 6 | 8 | 10 | 12 | 14 |
| 1 | 1 | 3 | 5 | 7 | 9 | 11 | 13 | 15 |
| 2 | 0 | 2 | 4 | 6 | 8 | 10 | 12 | 14 |
| 3 | 1 | 3 | 5 | 7 | 9 | 11 | 13 | 15 |
| 4 | 0 | 2 | 4 | 6 | 8 | 10 | 12 | 14 |
| 5 | 1 | 3 | 5 | 7 | 9 | 11 | 13 | 15 |
| 6 | 0 | 2 | 4 | 6 | 8 | 10 | 12 | 14 |
| 7 | 1 | 3 | 5 | 7 | 9 | 11 | 13 | 15 |
| 8 | 0 | 2 | 4 | 6 | 8 | 10 | 12 | 14 |
| 9 | 1 | 3 | 5 | 7 | 9 | 11 | 13 | 15 |
| 10 | 0 | 2 | 4 | 6 | 8 | 10 | 12 | 14 |
| 11 | 1 | 3 | 5 | 7 | 9 | 11 | 13 | 15 |
| 12 | 0 | 2 | 4 | 6 | 8 | 10 | 12 | 14 |
| 13 | 1 | 3 | 5 | 7 | 9 | 11 | 13 | 15 |
| 14 | 0 | 2 | 4 | 6 | 8 | 10 | 12 | 14 |
| 15 | 1 | 3 | 5 | 7 | 9 | 11 | 13 | 15 |

OUTPUT TABLE

FIG. 8

INPUT

| | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 8 | 9 | 10 | 11 | 12 | 13 | 14 | 15 |
| 2 | 7 | 0 | 1 | 2 | 3 | 4 | 5 | 6 |
| 3 | 15 | 8 | 9 | 10 | 11 | 12 | 13 | 14 |
| 4 | 6 | 7 | 0 | 1 | 2 | 3 | 4 | 5 |
| 5 | 14 | 15 | 8 | 9 | 10 | 11 | 12 | 13 |
| 6 | 5 | 6 | 7 | 0 | 1 | 2 | 3 | 4 |
| 7 | 13 | 14 | 15 | 8 | 9 | 10 | 11 | 12 |
| 8 | 4 | 5 | 6 | 7 | 0 | 1 | 2 | 3 |
| 9 | 12 | 13 | 14 | 15 | 8 | 9 | 10 | 11 |
| 10 | 3 | 4 | 5 | 6 | 7 | 0 | 1 | 2 |
| 11 | 11 | 12 | 13 | 14 | 15 | 8 | 9 | 10 |
| 12 | 2 | 3 | 4 | 5 | 6 | 7 | 0 | 1 |
| 13 | 10 | 11 | 12 | 13 | 14 | 15 | 8 | 9 |
| 14 | 1 | 2 | 3 | 4 | 5 | 6 | 7 | 0 |
| 15 | 9 | 10 | 11 | 12 | 13 | 14 | 15 | 8 |

PRESENT STATE (rows)

NEXT STATE TABLE

FIG. 9

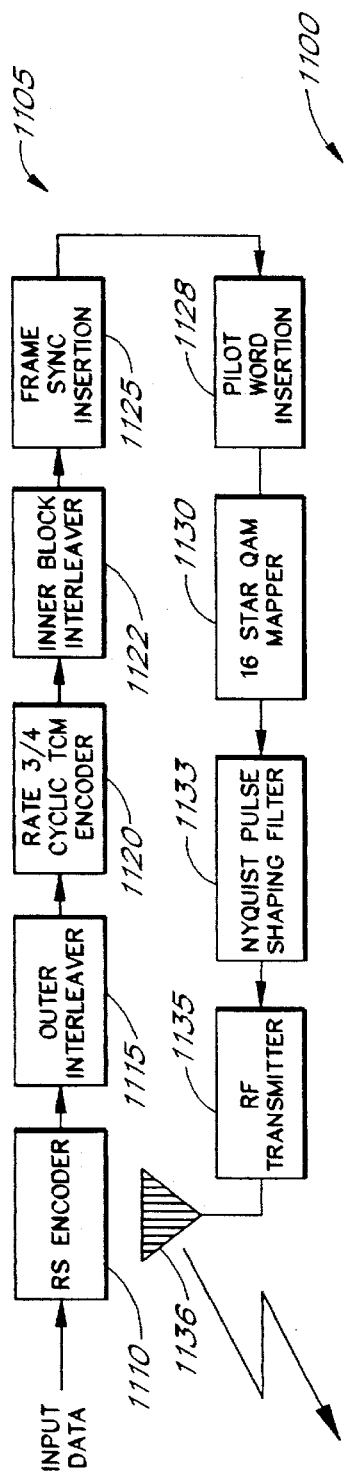
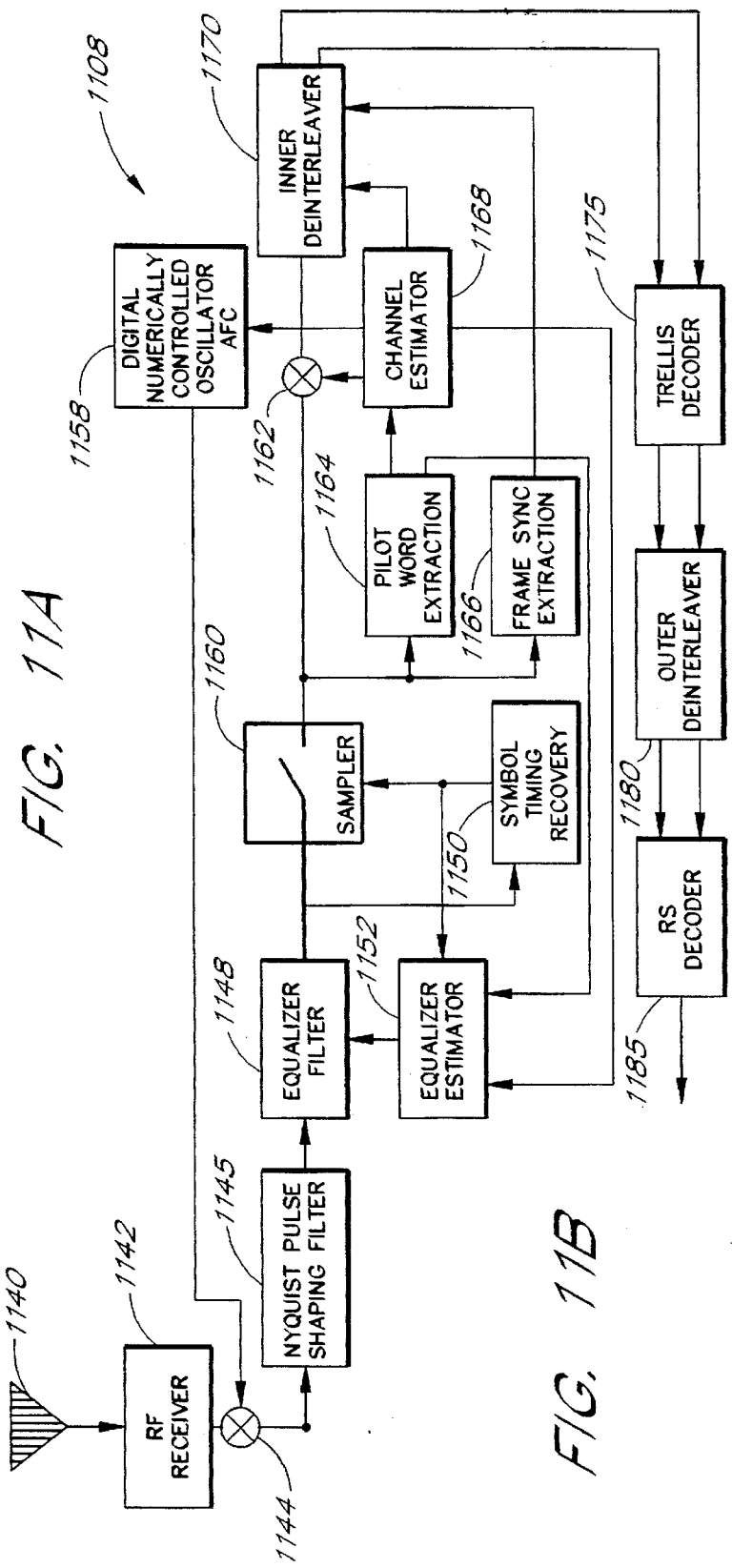
FIG. 11A
FIG. 11B

HIGH RATE REED-SOLOMON CONCATENATED TRELLIS CODED 16 STAR QAM SYSTEM FOR TRANSMISSION OF DATA OVER CELLULAR MOBILE RADIO

BACKGROUND OF THE INVENTION

1. Field of the Invention

The present invention relates to error-control techniques for mobile cellular data communication systems, and more specifically, to trellis coding of 16 Star Quadrature Amplitude Modulation (QAM).

2. Brief Description of the Related Art

In recent years, much of the research and development in the communications industry has been concentrated in the area of wireless data transmission. As is well known in the art, wireless data transmission typically involves transmission of data with a carrier frequency. The carrier frequency is modulated by the data so that a frequency bandwidth is occupied by the transmitted signal. The growing demand for access to mobile data and communication services has placed a significant strain on the available bandwidth. Moreover, there is an ever increasing demand for increased data communication rates for the purpose of decreasing the data transmission time. An increase of the rate of the data used to modulate the carrier frequency typically results in an increased bandwidth requirement, placing a further strain upon the available bandwidth for transmission of wireless signals.

In an effort to increase the data rates without sacrificing the available bandwidth, a number of modulation schemes together with sophisticated coding techniques have been developed. For example, Quadrature Amplitude Modulation (QAM) employs both amplitude and phase modulation in order to encode more data within a given frequency bandwidth. Another modulation technique involves Multiple Phase Shift Keying (MPSK) to increase data capacity within a given bandwidth. These high level modulation schemes are very sensitive to channel impairments. That is, the information encoded by means of such techniques is often lost during transmission due to noise, Rayleigh fading and other factors which are introduced over the communication medium.

In order to compensate for the increased sensitivity of these high level modulation schemes, various forward error correction coding techniques are employed. One widely accepted error coding technique is trellis coded modulation. Trellis coded modulation is highly desirable since it combines the operations of modulation and error coding to provide effective error control coding without sacrificing power and bandwidth efficiency. Trellis codes have been developed for many of the high level, high rate modulation schemes, including well-known 8-PSK modulation and Square 16 QAM modulation.

SUMMARY OF THE INVENTION

However, past systems have not considered providing an apparatus or method of trellis coding the 16 Star QAM modulation scheme. The advantage associated with the 16 Star QAM modulation scheme is that the 16 Star QAM scheme has better peak-to-average power characteristics than the widely used Square 16 QAM modulation scheme. Traditional mapping and encoding techniques for trellis coded modulation are based on partitioning the signal space into subspaces with increasing minimum distances. This technique can not be applied to constellations such as 16 Star QAM where only one level of partitioning is possible before the signal space can no longer be divided into subspaces with substantially increasing minimum distances.

A mobile radio communication system constructed in accordance with the teachings of the present invention comprises a cyclic trellis encoder which receives data inputs and trellis encodes the data. A 16 Star QAM mapper connects to the output of the cyclic trellis encoder. The 16 Star QAM mapper encodes data from the cyclic trellis encoder and maps the encoded data into a 16 Star QAM signal constellation. A radio frequency transmitter accepts the encoded and mapped data and transmits the data over a communication channel. A radio frequency receiver receives the transmitted data from the communication channel. A cyclic trellis decoder decodes the received data.

In one preferred embodiment, the cyclic trellis encoder is a rate ¾ encoder, and the communication system further comprises a Reed-Solomon encoder and a Reed-Solomon decoder.

In a particularly preferred embodiment, the communication system further comprises an outer block interleaver connected between the Reed-Solomon encoder and the cyclic trellis encoder.

In another preferred embodiment the communication system further comprises an inner interleaver connected between the cyclic trellis encoder and the 16 Star QAM mapper and an inner deinterleaver connected between the radio frequency receiver and the trellis decoder.

In a particularly preferred embodiment, the communication system further comprises a frame synchronization insertion circuit between the inner interleaver and the 16 Star QAM mapper. According to this embodiment, the communication system may further comprise a pilot word insertion circuit between the frame synchronization insertion circuit and the 16 Star QAM mapper. In a highly advantageous embodiment, the pilot word insertion circuit inserts a differential pilot word comprising at least two adjacent pilot channel symbols. According to this implementation of the invention, the communication system further comprises a feedback controlled equalizer filter and sampler circuit, as well as a pilot word extraction circuit and a frame synchronization extraction circuit between the radio frequency receiver and the inner deinterleaver.

In another embodiment, the communication system comprises a pilot word insertion circuit between the cyclic trellis encoder and the 16 Star QAM mapper. As a particularly advantageous implementation, the pilot word insertion circuit inserts a differential pilot word comprising at least two adjacent pilot channel symbols.

The present invention further provides a method of transmitting data comprising the steps of accepting input data to be transmitted, trellis encoding the input data, mapping the trellis encoded data according to a 16 Star QAM communication constellation, and transmitting the trellis encoded, 16 Star mapped data.

According to one preferred embodiment of the invention the method of transmitting further comprises the step of Reed-Solomon encoding the input data prior to transmission, and in a particularly preferred embodiment the method further comprises the step of interleaving the data prior to transmission.

According to a further embodiment, the method of transmitting data, further comprises the step of filtering the data prior to transmission.

In a highly preferred embodiment of the invention, the method of the present invention further comprises the step of encoding synchronization and differential pilot word symbols within the data before transmission.

The present invention further provides a method of rate ¾, cyclic trellis encoding a 16 star QAM signal by means of a 16-state cyclic trellis encoder. According to this method the encoder receives a three-bit input signal which is to be encoded into a four-bit output signal. The three-bit input signal corresponds to eight possible input values and the four-bit output signal corresponds to 16 possible output values. The encoder compiles an output look-up circuit wherein the 16 possible output values are defined as a function of the eight input values and 16 present states of the cyclic trellis encoder. The output table is compiled in such a manner as to output consecutively increasing even output values upon the application of consecutively increasing input values while in an even present state, and consecutively increasing odd output values upon the application of consecutively increasing input values while in an odd present state. The encoder further compiles a state transition look-up circuit wherein 16 next state values of the cyclic trellis encoder are defined as a function of the eight input values and the 16 present states of the cyclic trellis encoder. The state transition circuit outputs the first eight consecutive next state values upon consecutive application of the eight input values when in a first even present state. The state transition circuit then outputs next state values which are cyclicly shifted by one value from the next state values defined for the immediately previous even present state value upon application of the eight consecutive input values for consecutively increasing even present state values. The state transition circuit outputs the second eight consecutive next state values upon consecutive application of the eight input values when in a first odd present state. The state transition circuit outputs next state values which are cyclicly shifted by one value from the next state values defined for the immediately previous odd present state value upon application of the eight consecutive input values for consecutively increasing odd present state values. Once the output and state transition circuits have been compiled, the encoder applies the three-bit input signal to an input of the state transition circuit, thereby generating a next state value. The encoder stores the next state value over the duration of one input cycle until the stored next state value becomes a present state value. The encoder applies the present state value to an input of the output look-up circuit while simultaneously applying the three-bit input signal to another input of the output look-up circuit, thereby generating one of the 16 possible output values. Finally, a mapper, which amy be implemented within or external to the encoder, assigns a phase and amplitude coordinate in a 16 star QAM signal constellation to each of the output values generated by the output look-up circuit.

BRIEF DESCRIPTION OF THE DRAWINGS

FIG. 2A is an exemplary convolutional encoder circuit.

FIG. 2B is a state table describing the operation of the convolutional encoder of FIG. 2A.

FIG. 6 is a schematic representation of a trellis coding tree which graphically depicts the signal constellation space for a conventionally encoded Square 16 QAM signal constellation at each level of trellis coding.

FIG. 8 is an output table for a rate ¾, 16-state trellis encoder.

FIG. 9 is a next-state table for a rate ¾, 16-state trellis encoder.

FIGS. 11A and 11B are schematic block diagrams which depict the transmitter and receiver, respectively, of a trellis coding modem constructed in accordance with the teachings of the present invention.

DETAILED DESCRIPTION OF THE INVENTION

Figure 1A:
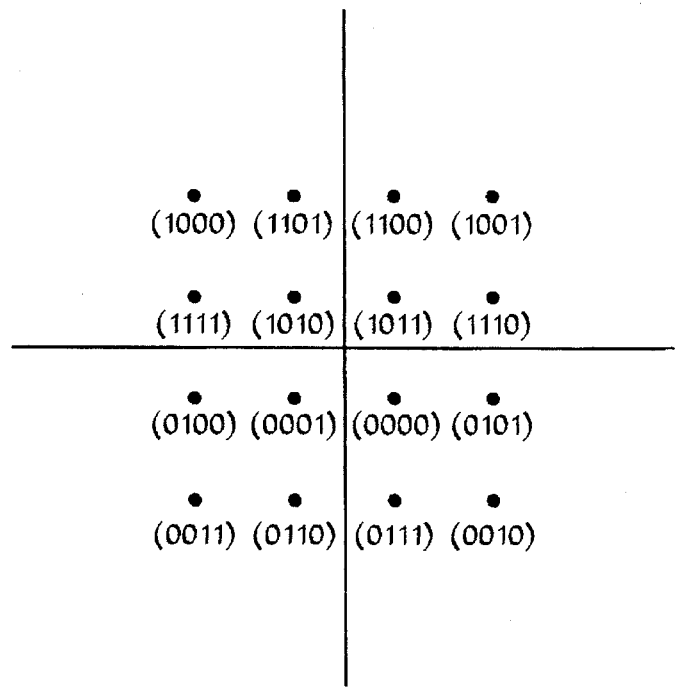
FIGS. 1A and 1B are graphical representations of signal constellations corresponding to Square 16 QAM and 16 Star QAM signals, respectively.
Figure 1B:
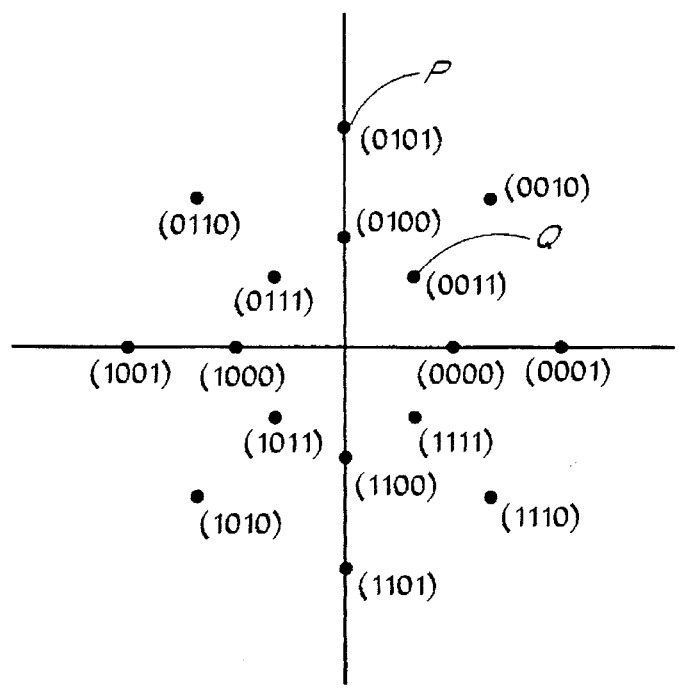

FIGS. 1A and 1B graphically depict signal constellations for a Square 16 QAM scheme and a 16 Star QAM scheme, respectively. The signal constellations depicted in FIGS. 1A and 1B are represented in polar coordinate form wherein each point of the signal constellations represents the determinate phase and the amplitude of an information symbol. For example, a point labeled "Q" in FIG. 1B corresponds to a signal having an amplitude defined as 1 and a phase of 45°, while a point labeled "P" in FIG. 1B corresponds to a signal having an amplitude defined as 2 which has a phase of 90°. For this particular 16 Star QAM constellation, the inner ring of signal points are amplitude value 1 points and the outer ring of signal points are amplitude value 2 points.

Signal constellations are a convenient way to graphically depict the binary data encoded by means of various phase and amplitude modulation schemes. For example, as shown in FIGS. 1A and 1B, there is a 4-bit binary word ("symbol") associated with each point on the 16-point signal constellations. This means that a detector is configured to assign a specified data word for a detected signal having a given amplitude and phase. Thus, for example, in the 16 Star QAM constellation of FIG. 1B, when a detector (or decoder) detects a signal which has an amplitude closest to 1, and which has a phase closest to 45°, the detector will assign the data word 0011 (decimal 3) to that signal. Similarly, when a detector detects a signal which has an amplitude closest to 2, and which has a phase closest to 90°, the detector will assign the data word 0101 (decimal 5) to that signal. The data assignments in FIGS. 1A and 1B are merely exemplary. Other assignments are possible, as will be apparent from the discussion below.

To minimize the effects of additive white Gaussian noise (AWGN) as well as the effects of Rayleigh fading and other channel impairments, one or more error encoding techniques are used in order to provide for accurate transmission and detection of data, especially when very high level modulation schemes are employed.

In accordance with the teachings of the present invention, both Reed-Solomon and trellis encoding techniques are employed in the transmission of data. The combination of these two error coding techniques in the system of the present invention is advantageous since the trellis decoder produces burst errors (i.e., errors which are typically bunched together in a sequence), while Reed-Solomon encoding is particularly useful for detecting and correcting burst errors. The concept of using multiple forward, error-correcting codes, such as trellis coded modulation together with Reed-Solomon encoding, is called concatenated coding.

REED-SOLOMON ENCODING

Reed-Solomon encoding is a block coding technique which is well known in the art. Briefly, block coding involves appending a series of parity bits onto a block of data. The parity bits contain parity information used for the detection and correction of errors in the data block. Depending upon the number of data bits in the data block, and the number of parity bits appended to each data block, a certain number of errors can be detected and/or corrected in that block at the receiver end. As is well known in the art, Reed-Solomon encoding provides a tradeoff between the number of errors that can be detected and the number of errors that can be corrected. Specifically, if there are k data symbols and n–k parity symbols per block of a Reed-Solomon encoded signal, a maximum of n–k errors within the block can be detected while a maximum of (n–k)/2 errors can be corrected. However, the decoder cannot both detect and correct the maximum numbers set forth above; the more errors which can be corrected, the fewer errors which can be detected by the receiver, and vice versa. For example, when a (63,53) Reed-Solomon code is used having 53 data symbols (k=53) and 10 parity symbols (n–k=10) for a total of 63 symbols (n=63), 10 symbol errors can be detected if none of the detected errors are corrected by the Reed-Solomon decoder, while a total of five symbol errors can be corrected if only those five are detected. In other words, if the number of corrections made is C, while the number of non-corrected detections is D, then 2C+D=10 for the (63,53) Reed-Solomon code. In one advantageous embodiment contemplated for use in the present invention as described in more detail below, seven symbol errors may be detected, and of those seven, three are correctable by means of the Reed-Solomon encoding. If in a given block of code more errors are detected than can be corrected, then the receiving element of the communication system requests a retransmission of that data block through an automatic repeat request scheme.

TRELLIS-CODED MODULATION

Trellis coding is an error coding technique which is also well known in the art. Trellis codes are convolutional codes that are designed and optimized according to a specific modulation scheme. A convolutional encoder encodes information symbols based upon the present input symbol and the state of the encoder. The present state of the encoder is determined by the symbols which previously entered the encoder. That is, the encoded symbol is a function of the present input symbol and also symbols that entered the encoder before the present input symbol. Thus, a convolutional encoder has memory.

Convolutional codes are typically implemented by shift registers and summers. The next state and the output of the encoder are functions of the present state of the register or look-up table (i.e., the value of the bits presently stored within the register or look-up table memory), and the input to the register or look-up table.

FIG. 2A and the accompanying table 230 shown in FIG. 2B illustrate an exemplary embodiment of a convolutional encoder 200 implemented by means of shift registers, and the corresponding state table. The encoder 200 is simply shown here in order to illustrate the operation and implementation of a convolutional encoder, and is not to be construed as an implementation of the trellis encoder used in accordance with the present invention. The encoder 200 includes shift register memory units 205, 210, 215, as well as summers 220, 225. A one-bit input is encoded into a two-bit output to provide rate ½ encoding.

Assuming an initial state of 000 (i.e., the register units 205, 210, 215 contain bit values of 0, 0, 0, respectively), and an input value of 0, the next state of the encoder 200 is 000 (a zero bit value shifts in while a zero value shifts out). Consequently, the value of the two bits at the output is 00. This is represented in the first line of the state table 230 in FIG. 2B. Note, however, that the present and next state columns only indicate two-bit values since the last state bit is always shifted out and is not significant in determining the next state. Thus, when moving from state to state, the encoder 200 can be considered to have four possible present states and four possible next states, each two-bit values. As another example, assume the encoder 200 to be in the present state 10 (i.e., the first two registers 205, 210 contain bits 1, 0, respectively). An input of 1 will move the encoder 200 to a next state of 11 (i.e., the first two registers 205, 210 contain bits 1, 1, respectively) and generate an output of 01 (decimal 1). This process is repeated as each successive bit enters the encoder 200 so that a state diagram can be constructed which shows the possible state transitions of the encoder 200 with the accompanying input and output values which correspond to those transitions.

Figure 3:
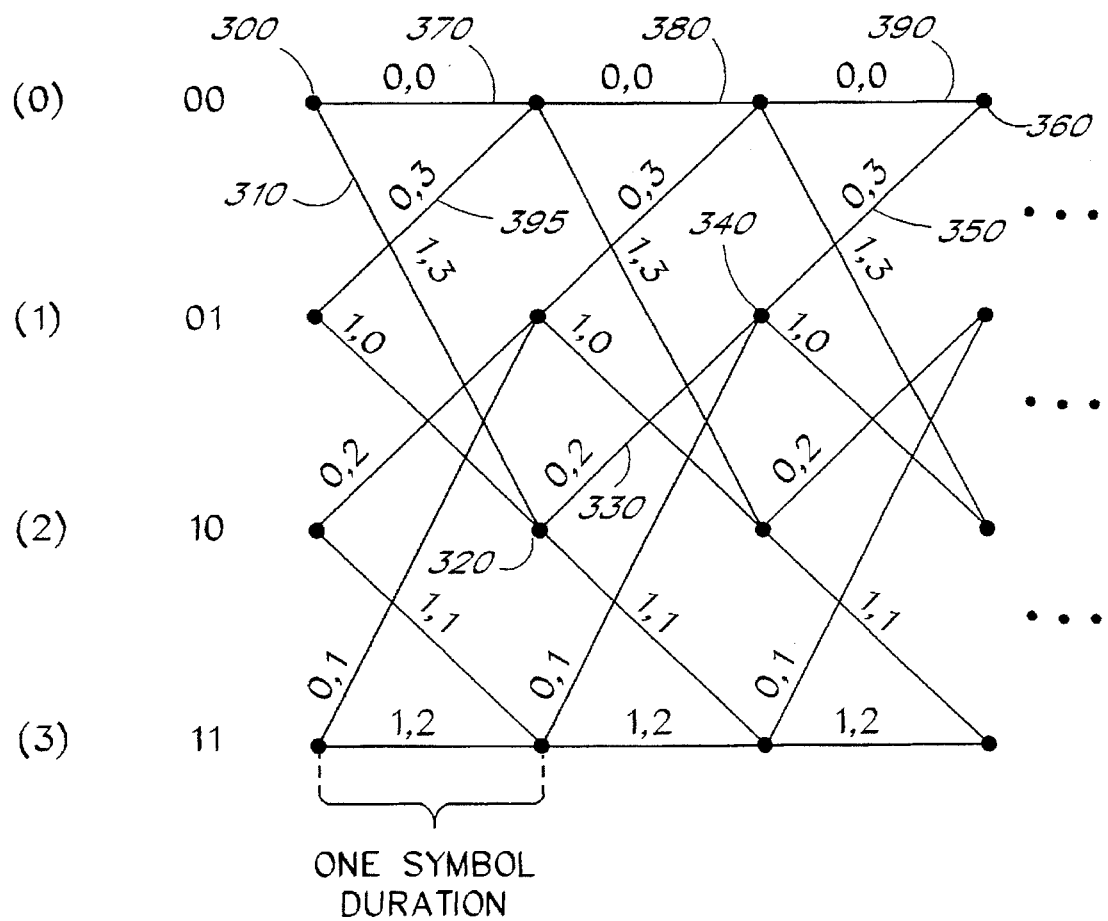
FIG. 3 is a trellis state transition diagram representing the operation of the convolutional encoder circuit of FIG. 2A.

FIG. 3 is a state transition diagram which indicates the possible state transitions of the encoder 200 of FIG. 2, along with the input and output values corresponding to the possible transitions. Because the state transition diagram resembles a trellis in form, such diagrams are often called trellis diagrams, hence the name "trellis coding." Each dot on the trellis diagram of FIG. 3 represents a state of the encoder 200. Dots in the same horizontal row correspond to the same state at different times. Dots in the same vertical column represent different states at the same time (i.e., within the duration of the same symbol). Branches between the dots represent possible state transition paths. Thus, for example, there is a branch between the state 01 and the state 00 which indicates that, given the appropriate input, the encoder 200 could go from state 01 to state 00. Since there is no branch between states 01 and 11, nor is there a branch between the states 01 and 01, it is not possible for the encoder 200 to go from state 01 to either of the states 11 or 01 within one symbol duration.

The number pair along each of the branches depicted in FIG. 3 indicate the [input, output] values which correspond to a given branch. The first number represents the input which causes the transition, while the second number represents the output value resultant upon this transition.

As seen from the trellis diagram of FIG. 3, the possible state transitions for the encoder 200 are the same for each successive symbol. Thus, the same pattern repeats over and over again for each symbol duration.

As an example, assume the encoder 200 begins in the state 0 (binary 00), represented by a dot 300 in FIG. 3. Upon application of an input value 1 to the encoder 200, the encoder 200 goes from state 0 to state 2 (binary 10), represented by a dot 320, via a path 310. Upon completion of the transition, the encoder 200 outputs a value 3 (binary 11). If the value of the next bit applied to the input is 0, then the encoder 200 transitions from state 2 to state 1, represented by a dot 340, via a path 330, while the output of the encoder 200 assumes a value of 2. Finally, upon application of an input bit of 0, the encoder 200 moves from the state 1 to the state 0, represented by a dot 360, via a path 350. Upon entering the state 0, the encoder 200 outputs a value 3. Thus, in the foregoing example, input bits 1-0-0 are encoded by the encoder 200 into output bits 11-10-11, or 3-2-3 in decimal. At the same time, the encoder 200 has transitioned from the state 0 to the state 2, to the state 1, and back to the state 0.

Maximum Likelihood Viterbi Decoding

As further explained below, convolutional encoding (and Viterbi decoding) provides for a reduced number of detected errors at the receiver. Consider again the trellis diagram of FIG. 3. For example, assume that a three-bit data stream 1-0-0 is properly encoded as 11-10-11 by the encoder 200 as described above. Also suppose that the receiver detects the transmitted signal erroneously as 11-11-11. In order to determine what the original transmitted data is, the decoder performs a maximum likelihood decision based upon the possible state transition paths which the encoder 200 might have taken. Since the encoder is typically set to state 0 at initialization, the decoder assumes that the detected sequence of data bits began in state 0. The decoder then examines all of the paths which began at state 0 and terminate at a state three symbols later as depicted in FIG. 3 for the purpose of illustration. For instance, for an ending point at the state 0, at the point 360, there are two possible paths which the encoder may have taken: the path 310, 330, 350, or the path 370, 380, 390. Of course, all the other paths of three symbol duration are also examined to determine the likelihood that the detected bit sequence followed these possible paths, but for the sake of simplicity of illustration, only the paths from state 0 to state 0 are considered here.

In order to identify the most likely path, the decoder determines the probability that the detected data sequence was produced by the first path (e.g., the path 310, 330, 350), the probability that the detected data sequence was generated by the second path (e.g., the path 370, 380, 390), and so on until a probability has been calculated for each possible path. The path having the highest probability is then selected as the actual path according to either hard or soft decision methods described in greater detail below.

Typically, trellis decoding techniques calculate path probabilities based upon either Hamming or Euclidean distances between the detected signal and the signals generated by the possible trellis paths. In accordance with the teachings of the present invention, Euclidean distances are used as the measure of path probability, as discussed in greater detail below. However, in order to provide a clearer understanding of the method of determining the probability of a possible trellis path, a brief discussion of Hamming distance is also provided,

Hamming Distance (Hard Decision Decoding)

Hamming distance is defined as the number of bits by which two binary sequences differ. For example, the hamming distance between the binary words 110 and 101 is two, while the hamming distance between the binary words 111 and 011 is one, etc. Based upon a Hamming distance evaluation of the possible paths, the probability that a given path has generated a detected data sequence can be determined as follows. Assuming, as stated above, that the detected data sequence is 11-11-11 (with a proper data sequence of 11-10-11), and the possible paths are the paths 310, 330, 350 and 370, 380, 390, the Hamming distance between the detected signal 11-11-11 and the path 310, 330, 350 is 1. That is, because the path 310 generates an output of 3 (11), the path 330 generates an output of 2 (10), and the path 350 generates an output of 3 (11), the binary sequence generated by the path 310, 330, 350 is 11-10-11. This sequence differs from the detected sequence 11-11-11 by a Hamming distance of 1. The Hamming distance between the detected signal 11-11-11 and the signal generated by the path 370, 380, 390 is 6 since the path 370, 380, 390 results in an output binary sequence of 00-00-00. Thus, it is much more likely that the detected sequence 11-11-11 was generated by the path 310, 330, 350, than by the path 370, 380, 390. Therefore it is more likely that the sequence of input bits is 1-0-0.

Euclidean Distance (Soft Decision Decoding)

Another measure of the probability that a given path has generated a binary sequence is based upon Euclidean distance. Euclidean distance is the length of a straight line between points on a signal constellation. In general, probability measures based upon Euclidean distances exhibit better accuracy than probability measures based upon Hamming distance. This is because probability measurements based upon Euclidean distance take into account the received signal phase and amplitude information which is discarded when using Hamming distance as a probability metric. For example, FIGS. 4A-4D illustrate a simple 4-PSK modulation signal constellation having four defined points 400, 410, 420, 430 equidistant from the origin and corresponding to output values 00, 01, 10, and 11, respectively. Suppose a sequence of received data symbols are detected to have phase and amplitude values which are represented by the vectors r1-r3 in FIGS. 4A-4C. Using conventional Hamming decoding techniques, the vectors r1-r3 would simply be approximated as the data points 00, 10, and 00, respectively, so that valuable phase and amplitude information is lost about the actually detected signal sequence. In accordance with Euclidean techniques, however, the phase and amplitude of the received signal are factored into the determination of the path probability.

Figure 4A:
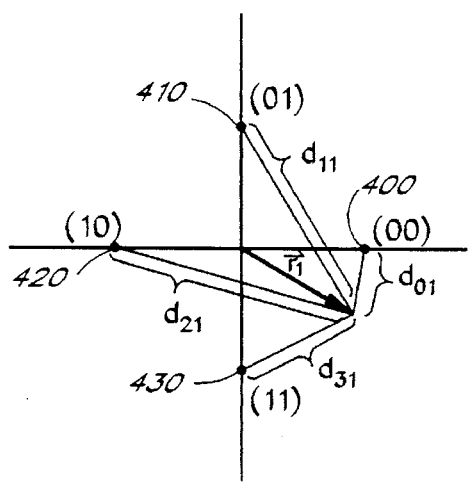
FIGS. 4A–4C are 4-PSK signal constellations which illustrate the method used to determine trellis path probabilities according to Euclidean distances along a trellis diagram represented in FIG. 4D.
Figure 4B:
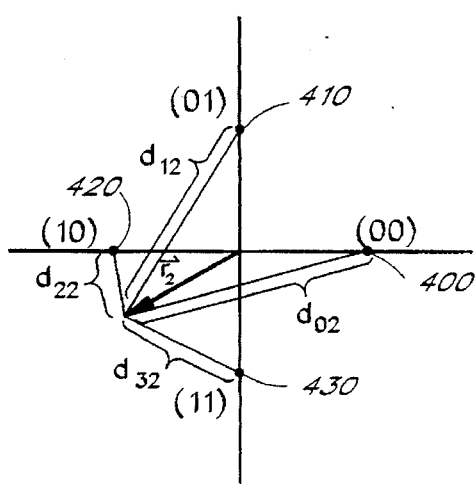
Figure 4C:
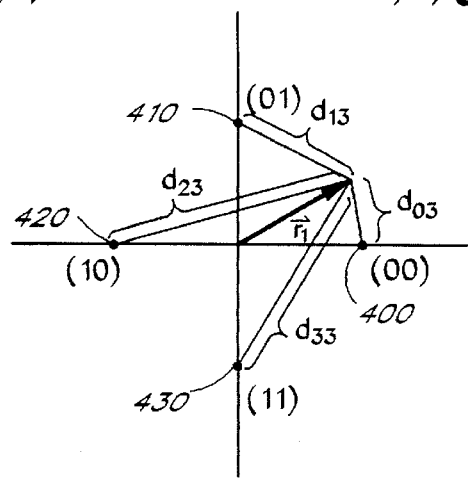
Figure 4D:
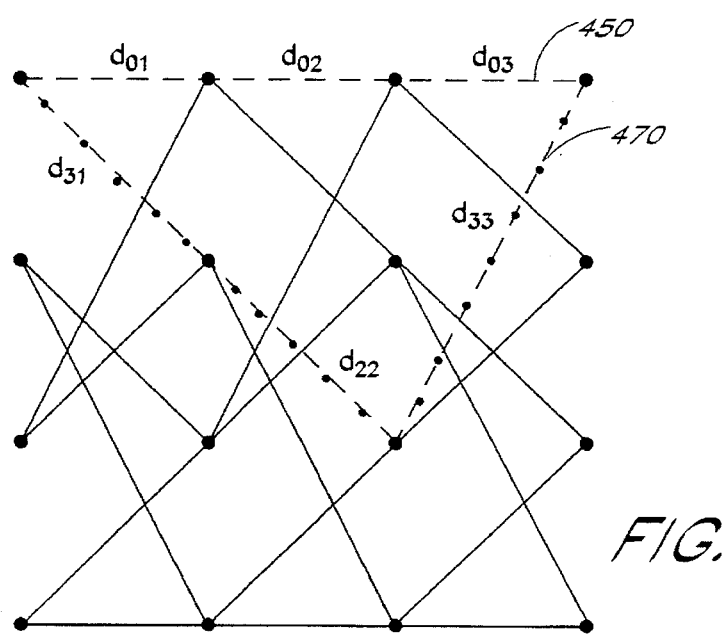

As shown in FIG. 4D, the probability that the detected signal has been generated by the trellis path represented by the dashed line 450 is a decreasing function of the sum of the squares of the Euclidean distances d01, d02, and d03, (depicted in FIGS. 4A-4C), while the probability that the detected signal has been generated by the trellis path represented by the dashed/dotted line 470 is a function of the sum of the squares of the Euclidean distances d31, d22, and d33. The greater the sum of the squares of the Euclidean distances along a given path, the less likely that path is to be the one which generated the detected signal sequence. In this manner, a more accurate estimation of the transmitted data sequence can be obtained.

It should be understood, of course, that as the number of points in the signal constellation (i.e., the number of possible output values) and the number of states in the trellis encoder increase, the number of possible trellis paths increases as well. Thus, for example, a rate ¾ trellis encoder which operates in conjunction with a 16 point constellation will have 8 possible branches merging into and diverging out of each state (represented by a point) on the trellis state transition diagram. In these systems, the probability associated with each path merging into a state point is determined. Once these probabilities have been compared, the path with the highest probability is determined and the corresponding data bits in that path are selected as the decoded sequences.

Block and Symbol-By-Symbol Decoding Methods

The selection of a given path may be made in accordance with block or symbol-by-symbol decision methods. In the case of a block decision, a predetermined number of received signals forming a set (e.g., 1,000 symbols) are fed into the decoder. The decoder then starts with the first signal and constructs a trellis with associated metrics and path histories for the whole set of 1,000 symbols. The trellis transition path that is most probable is then selected as the path which generated the detected symbols. The data input which would have generated this path is then determined as the decoded data sequence. Absent any uncorrected errors, this data sequence should correspond to the data sequence fed into the encoder on the transmitter side of the communication system. The process is then repeated with the next block of symbols, and so on.

For symbol-by-symbol decisions, a predetermined number of received signals are fed into the decoder. For example, assume 25 signals are fed into the decoder. Once the 25th symbol is entered, the trellis decoder determines what path was most probable. The input symbol which would have generated the first branch of the most probable path is then selected as the output of the decoder. The next (e.g., the 26th) received signal is then fed into the decoder and another determination is made of the most probable path for the last 25 symbols (i.e., excluding the first symbol). The input symbol which would have generated the first branch of the most probable path (i.e., the path for the most recently detected 25 symbols) is then selected as the next output of the decoder. This procedure is carried on symbol-by-symbol in real time so that only one symbol at a time is decoded for output as opposed to an entire block of data at a time.

Maximizing Euclidean Distance in Trellis Coding

Gottfried Ungerboeck, in a paper entitled "Channel Coding with Multilevel/Phase Signals," published January, 1982 in IEEE TRANSACTIONS ON INFORMATION THEORY, Vol. IT-28, No. 1, and herein incorporated by reference, argued that error performance of convolutional codes could be improved if designed by maximizing the Euclidean distances between trellis pat which merge into and out of the same state. This is accomplished by tailoring the convolutional coding scheme to the signal constellation of a given modulation technique so that the operations of error coding and modulation are essentially combined.

Figure 5:
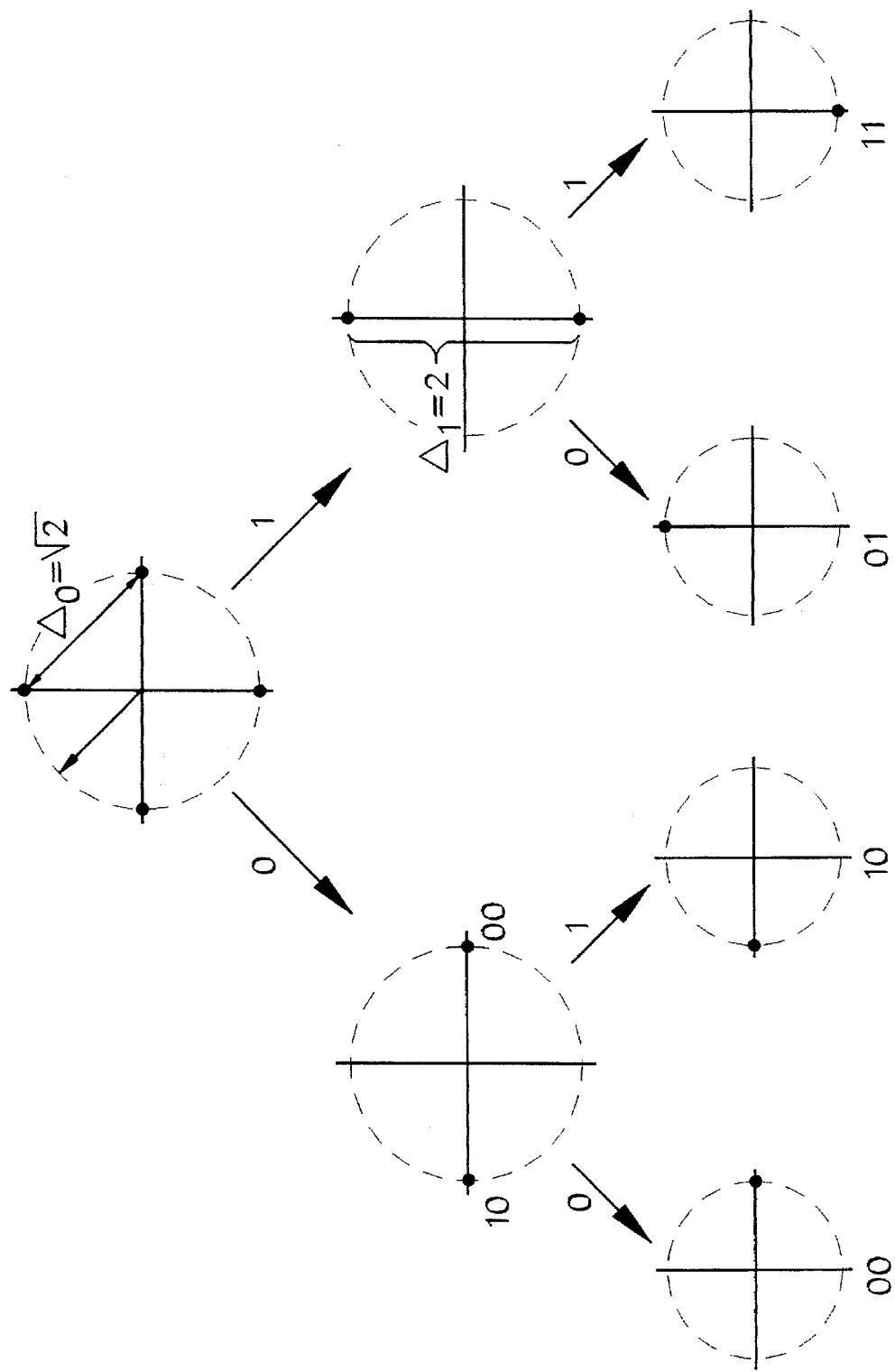
FIG. 5 is a trellis set partitioning tree for a 4-PSK signal constellation.

Take as a simple example a 4-PSK signal constellation as shown in FIG. 5. The possible outputs of the trellis encoder on the transmitter side are represented as four points which are phase shifted from one another by phase differences of 90°. In any trellis coding scheme the possible output values, as represented in the signal constellation, as well as the states of the trellis decoder are both considered. In order to provide the maximum distinction between encoded signals, so as to allow for more accurate decoding, it is advantageous to assure that transitions to and from the same state differ greatly in their output values (in terms of their Euclidean distances). For example, the trellis diagram of FIG. 3, which may, for example, describe state transitions for the 4-PSK signal constellation of FIG. 5, has the branches 370, 310 diverging from the same state point 300. Note that the output value for the state transition branch 310 is 3, and the output value for the state transition branch 370 is 0. In accordance with the Ungerboeck teaching, these two output values differ by the maximum Euclidean distance (i.e., a Euclidean distance of 2 as represented in FIG. 5). In a similar way, state transitions resulting in the same output values are assigned as transitions between two different states. Note, for instance, that the transition path 310 which results in an output value of 3 advances from state 00 to state 10, while a transition path 395 which also results in an output value of 3, advances from state 01 to state 00. The Ungerboeck method thus assures good discrimination between the encoded data signals.

The most common method of trellis encoding in accordance with Ungerboeck's teachings is set partitioning, of which a simple example is shown in FIG. 5. By partitioning the original 4-PSK signal into two sets of diametrically opposed 2-PSK signals based upon the state of the trellis encoder, the maximum Euclidean distance can be maintained between outputs merging into or diverging out of the same state. Such set partitioning diagrams are commonly referred to as trellis coding trees.

Figure 6:
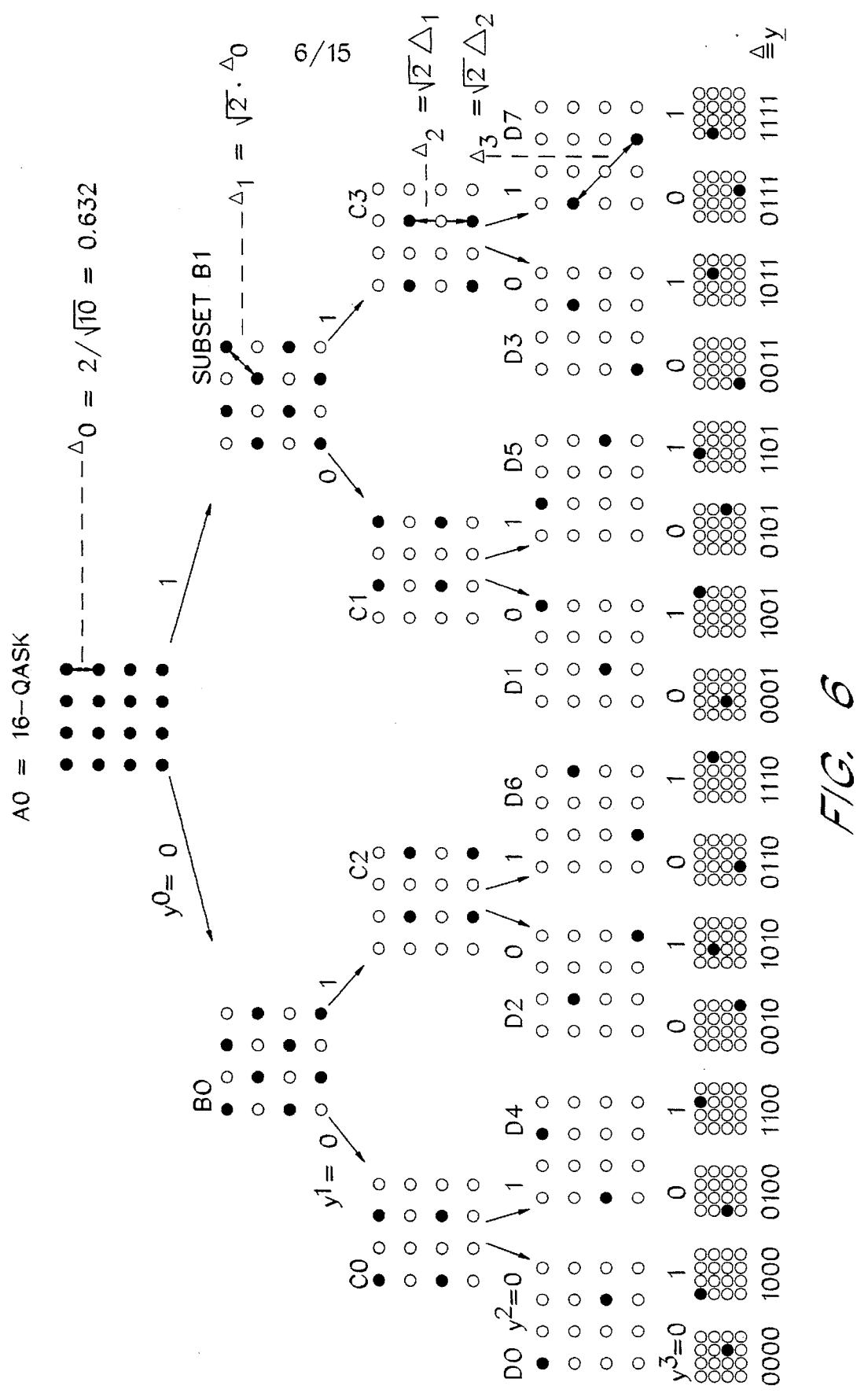

FIG. 6 graphically represents a trellis coding tree for set partitioning a more complicated Square 16 QAM signal constellation by the Ungerboeck method, which is well known in the art. As shown in FIG. 6, a complex signal constellation is broken up into subsets. It is a requirement of Ungerboeck's set partitioning method that the minimum Euclidean distances measured between any of the points on the subset constellations exceed the minimum Euclidean distance between points on the constellation from which the subsets are derived. Thus, for example, as shown in FIG. 6, the minimum Euclidean distance between any two points on the original constellation at the top of the trellis coding tree is less than the minimum Euclidean distance between any points of the constellation shown in subsets $B_0$ or $B_1$. In like fashion, the minimum Euclidean distances between any two points on the constellation subsets $C_0$ and $C_2$ is greater than the minimum Euclidean distance between any two points in the subset $B_0$, and so on. As detailed above, an increased minimum Euclidean distance between any two points in a signal constellation insures that the probability of mistaking similar encoder output sequences is minimized. The error performance of the coded scheme is a function of the minimum Euclidean distance between any two given paths. To reduce the probability of error, the minimum Euclidean distance must be increased. Therefore, the mapping by set partitioning technique provides for optimum error performance.

Set Partitioning of the 16 Star QAM Signal Constellation

Figure 7:
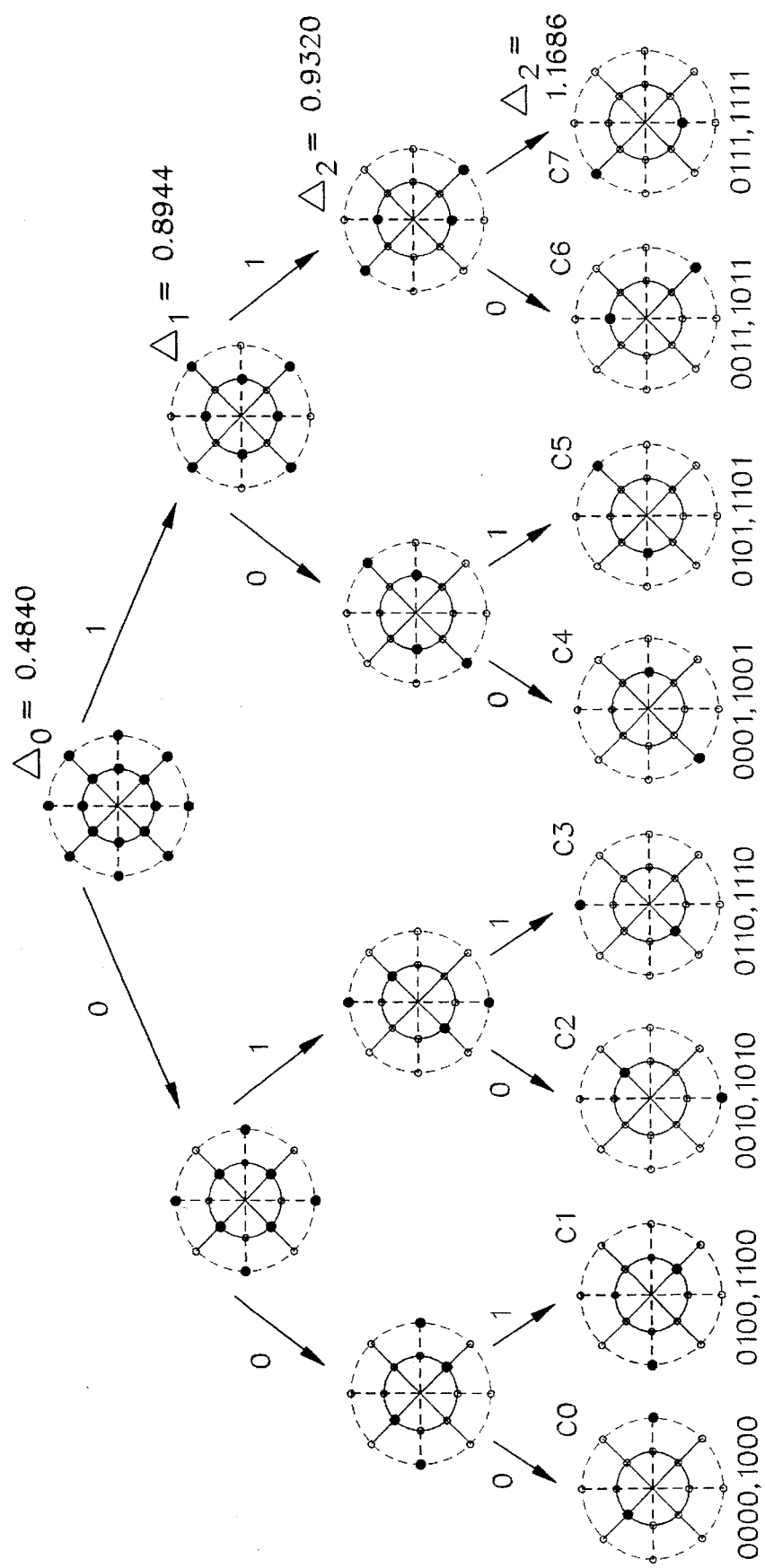
FIG. 7 is a schematic representation of a trellis coding tree which graphically depicts the signal constellation space for a 16 Star QAM signal constellation at each level of trellis coding in accordance with the method of the present invention.

Unlike the Square 16 QAM signal constellation, the 16 Star QAM signal constellation does not allow for division into subsets such that the minimum Euclidean distance between points increases significantly for each level of partitioning. FIG. 7 illustrates the difficulty of set partitioning the 16 Star QAM signal constellation. For the first level of set partitioning there is no difficulty; the constellation divides symmetrically, and the minimum Euclidean distance between the point on the first subset is considerably greater than the minimum Euclidean distance between the points on the original constellation. However, at the second level of set partitioning, the minimum Euclidean distances are substantially the same as at the first level of set partitioning. Due to this characteristic of the 16 Star QAM signal constellation, it has been thought that it is not possible to effectively trellis code a 16 Star QAM signal using conventional Ungerboeck coding techniques.

In order to solve the problems associated with the set partitioning of the 16 Star QAM constellation, the present invention includes a specially designed trellis encoder/decoder within a transmit/receive communications system. The encoder/decoder is constructed to encode according to an inventive method called cyclic trellis coding which has been found to work advantageously for signal constellations such as 16 Star QAM or any arbitrary signal constellation. Cyclic trellis coding is described in detail below.

CYCLIC TRELLIS CODING

Cyclic trellis coding involves a method of error encoding which may be adapted to the 16 Star QAM signal constellation, although it has been found that cyclic trellis coding can be applied to modulation schemes with any signal constellation that can be partitioned into two symmetric subsets. Moreover, it has been verified that error performance of a system using cyclic trellis coding, together with a 16 level modulation scheme, is as good or better than systems employing the previously used Ungerboeck codes for trellis encoders having up to 16 states.

To cyclic trellis encode a signal, the signal constellation is first partitioned into two sets. This is the same as dividing the possible outputs into two sets of output values. The possible states of the encoder are also divided into two sets. The output and state partitioning is most readily represented in table form. Because a trellis code is entirely determined by four factors (i.e., the input, the present state, the next state, and the output) a trellis code can be represented by two tables as depicted in FIGS. 8 and 9. The table shown in FIG. 8 presents the output values as a function of the input and the present state values, while the table shown in FIG. 9 presents the next state values as a function of the input and present state values.

In accordance with the teachings of the present invention, a rate ¾ cyclic trellis encoder for encoding a 16 Star QAM signal partitions the output values into even and odd sets, as represented in the table of FIG. 8. As is well known in the art, a rate ¾ trellis encoder receives 3 input lines (corresponding to 8 possible input values) and generates outputs on four lines (corresponding to 16 possible output values). For the particular embodiment of the present invention it has been found that a 16-state encoder is sufficient, so that there are 16 present state values and 16 next state values. As shown in the table of FIG. 8, each of the even present-state values results in an even output value upon the application of an input value. Similarly, each of the odd present-state values results in an odd output value upon the application of an input value. For example, if the trellis encoder is presently in state 5 (binary 0101) and an input of 4 (binary 0100) is applied, the output value produced by the encoder is 9 (binary 1001).

Figure 10:
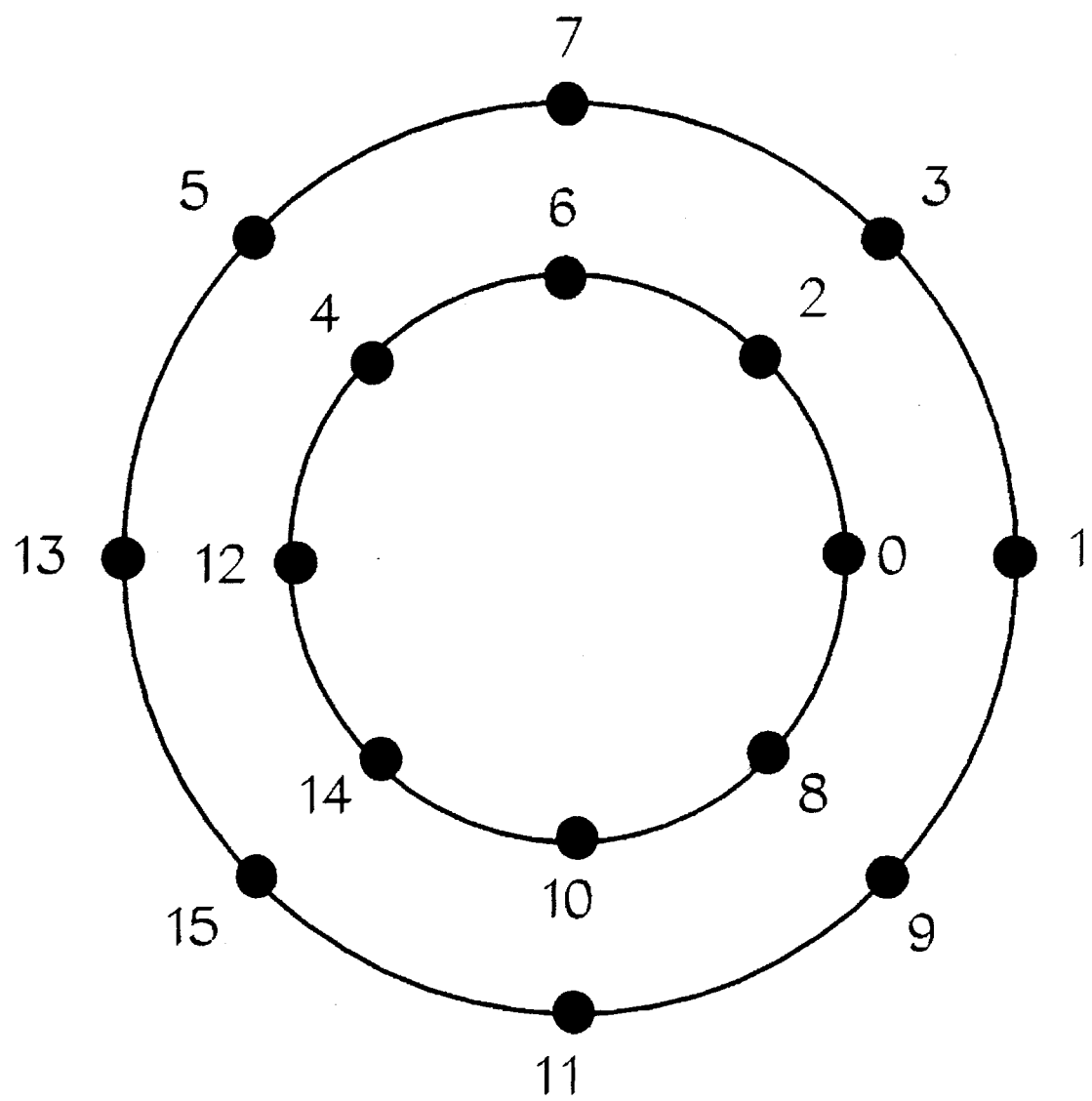
FIG. 10 illustrates the Gray coding assignments for a 16 Star QAM signal constellation.

In one embodiment, the output values are assigned to the 16 Star QAM constellation points according to well known Gray coding techniques. FIG. 10 shows the Gray coding output assignments for 16 Star QAM constellation.

The table of FIG. 9 represents the next state of a rate ¾ cyclic trellis encoder as a function of the input and present state values. As shown in FIG. 9, the next state value is cyclicly partitioned into multiple sets. That is, the first eight next state values (0–7) are assigned, in order, to the first present state value, while the last eight next state values (8–15) are assigned, in order, to the second present state value. The first eight next state values are then assigned again to the third present state value, but not in order from 0 to 7. Rather, the order is 7, 0, 1, 2, 3, 4, 5, 6. Thus, the third next state row is like the first next state row, but cyclicly shifted to the right. This pattern is repeated between the fourth and second rows with the "15" being shifted into the first position while the "14" is shifted into the last position of the row. Stated in its most general form, every next state row takes the last value from the row immediately preceding the previous next state row and places this value in the first position while shifting the other values by one position. This method is repeated until an entire next state table is defined.

It will be appreciated that the method described above with reference to a rate ¾, 16-state trellis encoder can be employed in accordance with other encoder forms as well, such as rate ⅔ trellis encoders, etc. For application to the 16 Star QAM format, however, the preferred embodiment of the present invention is the rate ¾ 16-state trellis encoder defined by the tables in FIGS. 8 and 9. As is well known in the art, an encoder defined by the tables in FIGS. 8 and 9 may be implemented as a look-up table, or an input/output state machine circuit.

CYCLIC TRELLIS CODED 16 STAR QAM COMMUNICATION SYSTEM

In one preferred embodiment, the system and method of the present invention provides trellis coding for 16 Star QAM format signals together with Reed-Solomon block coding to provide a low error communication link. Once the data has been Reed-Solomon encoded, the data is further encoded by means of cyclic trellis coding along with well known interleaving operations. The transmitter then inserts synchronization frames and pilot words for purposes of synchronization and channel fading compensation at the receiver. The data is then 16 Star QAM mapped, filtered, and transmitted. In order to recover the transmitted data on the receiver side, filtering and synchronized sampling are performed. Deinterleaving, cyclic trellis decoding, and Reed-Solomon decoding are then performed to recover the original data.

FIGS. 11A and 11B are block diagrams depicting a specific implementation of one embodiment of a mobile cellular wireless communication system constructed in accordance with the teachings of the present invention. The wireless communication system 1100 includes a transmitting side or circuit 1105 (FIG. 11A) and a receiving side or circuit 1108 (FIG. 11B).

The transmitting side 1105 of the wireless communication system comprises a Reed-Solomon encoder 1110 which provides an input connection to an outer interleaver 1115. The outer interleaver 1115 connects to a cyclic trellis coded modulator encoder 1120. The structure and operation of the cyclic trellis encoder 1120 is described in greater detail below with reference to FIG. 14. The output of the trellis coded modulator encoder 1120 serves as input to an inner interleaver 1122. The inner interleaver 1122 connects to a frame synchronization inserter 1125 which connects to a pilot word inserter 1128. The output of the pilot word inserter 1128 is provided as an input to a 16 Star QAM mapper 1130 which assigns a four-bit binary sequence to a point on the signal constellation by transforming the input symbol into a signal having an assigned phase and amplitude. The output of the 16 Star QAM mapper 1130 is fed into a Nyquist pulse shaping filter 1133 which in turn connects to an RF transmitter 1135 having a transmitting antenna 1136.

A modulated carrier signal is transmitted over a communications medium to the receiving side 1108 of the wireless communication system 1100. The communications medium includes the air between the transmitter base station and the mobile unit, as well as any structures or landscape from which the radio frequency signal may be reflected. A receiving antenna 1140 connects to an RF receiver 1142, which in turn provides input to a complex multiplier 1144. The complex multiplier 1144 also receives an input from a digital numerically controlled oscillator/automatic frequency controller (DNCO/AFC) 1158. The complex multiplier 1144 connects to a nyquist pulse shaping filter 1145. The output of the nyquist pulse shaping filter 1145 serves as input to an equalizing filter 1148. The output of the equalizer filter 1148 connects to both a symbol timing recovery circuit 1150 and a sampler 1160. The symbol timing recovery circuit 1150 connects to an equalizer estimator 1152 which in turn connects to the equalizer filter 1148. The sampler 1160 also receives inputs from the symbol timing recovery circuit 1150 and provides output to a multiplier 1162, a pilot word extraction circuit 1164, and a frame synchronization extraction circuit 1166. The multiplier 1162 also receives inputs from a channel estimator 1168. The channel estimator 1168 receives inputs from the pilot word extraction circuit 1164 and provides outputs to both the equalizer estimator 1152 and the digital numerically controlled oscillator/automatic frequency control circuit 1158. The pilot word extraction circuit 1164 also provides inputs to the equalizer estimator 1152. The multiplier 1162, the channel estimator 1168, and the frame synchronization extraction circuit 1166 all provide inputs to an inner de-interleaver 1170. The inner de-interleaver 1170 provides dual inputs to a trellis decoder 1175 which in turn connects to an outer de-interleaver 1180. Finally, the outer de-interleaver 1180 provides inputs to a Reed-Solomon decoder 1185.

During operation of the wireless communication system, data to be transmitted is input into the Reed-Solomon encoder 1110 wherein conventional Reed-Solomon encoding is performed. The purpose of the Reed Solomon encoder 1110 is to compensate for burst errors made by the trellis encoder 1120. Burst errors are simply errors which occur close together in the transmission sequence. The trellis encoder is susceptible to producing burst errors because trellis encoders make decoding decisions over several symbols. Therefore, if the path is incorrect, several symbols along that path may be incorrectly decoded, so that when a trellis encoding error occurs, it is likely to result in a burst of errors.

As discussed above, the present embodiment of the Reed-Solomon encoder allows for the detection of seven errors and the correction of three of those errors within each length of the block code. In one preferred embodiment, the suggested Reed-Solomon code is the well known (63,53) code having a block length of 63 symbols. In the (63,53) code, the encoded sequence consists of 53 Reed-Solomon symbols of data and 10 parity symbols produced by methods well known in the art. Each Reed-Solomon symbol contains six information bits or two channel symbols.

The Reed-Solomon encoded data serves as the input for the outer interleaver 1115. The outer interleaver 1115 is used to spread burst errors into adjacent code blocks. This helps the Reed-Solomon encoder to correct for burst errors associated with trellis decoding. As stated above, one preferred embodiment of the invention includes a Reed-Solomon decoder which can correct up to three errors within a 63 Reed-Solomon symbol block of code. Thus, for example, if one block of 63 symbols has five errors, while the adjacent block has one error, spreading out the errors so that each block has three errors allows the Reed-Solomon decoder to correct both blocks.

In one simple implementation, the outer interleaver 1115 is a buffer with S columns and D rows where S stands for the span and D stands for the depth of the interleaver 1115. The Reed-Solomon encoded symbols are written into a matrix by rows, (i.e., first row followed by the second row, etc.) and read out by columns (i.e., first column followed by the second column, etc.). When a group of Reed-Solomon encoded symbols enters the interleaver 1115, this data is written into a row of the matrix having S memory locations (where each memory location contains one Reed-Solomon symbol of data). These data are then read out of the outer interleaver 1115 by columns so that the Reed-Solomon encoded symbols which were once adjacent to one another are separated by D symbol spaces and spread across various Reed-Solomon blocks.

In order to spread the Reed-Solomon errors across many blocks, the span of the outer interleaver is the same as the length of the Reed-Solomon block, 63 Reed-Solomon symbols in this case, or equivalently, 126 channel symbols since every Reed-Solomon symbol comprises two channel symbols. The depth of the outer interleaver should be chosen to overcome the burst errors out of the trellis decoder. In one actual embodiment, the interleaving depth is 5 channel symbols.

The Reed-Solomon encoded and interleaved symbols enter the cyclic trellis encoder 1120 three bits at a time. As discussed above, trellis encoding is used to protect the data against channel impairments. The trellis encoder 1120 is implemented as a look-up table or as an input/output state machine circuit. The trellis encoder 1120 also includes a 16 Star QAM mapper (see FIG. 14). The 16 Star QAM mapper maps the incoming data sequence into a 16 Star QAM constellation according to Gray coding, a technique which is well known in the art. Briefly, Gray coding involves assigning the bit values with the greatest Hamming distance to the signal constellation points which are farthest apart by Euclidean measurements, while those symbols which are closer by Hamming measurements are assigned points in the signal constellation which are closer according to Euclidean measurements. Thus, for example, 00 and 11 would be assigned diametrically opposed points in a 4-PSK constellation, while 00 and 01 would be 90° from one another. A specific embodiment of a rate ¾ cyclic trellis encoder will be described in greater detail below with reference to FIG. 14.

The rate of the convolutional encoder is ¾ in a preferred embodiment. That is, for every three bits input into the encoder 1120, four bits are output, so that there is one parity bit for every three data bits. A ¾ encoding rate, in conjunction with a 16-level modulation scheme, provides a bandwidth efficiency of 3 bits per second per hertz. That is, if approximately 30 KHz of bandwidth is used, corresponding to 30 thousand symbols per second, then one symbol is transmitted per second for every one Hz of bandwidth. But each symbol contains four bits in 16 QAM format, of which three are data bits, so that a net transmitting efficiency of approximately 3 bits per second per hertz is achieved.

The Trellis code used to encode the incoming data symbols is designed for good error performance over the Rayleigh fading channel. In one advantageous embodiment, the trellis code is a cyclic trellis code with 16 states, as described in the section above entitled Cyclic Trellis Coding.

The Trellis encoded symbols are then block interleaved in the inner interleaver 1122 in much the same manner as described above with reference to the outer interleaver 1115. The inner interleaver 1122 is used to reduce errors associated with trellis coding due to fading. In wireless communications systems, the information signal is transmitted to the receiver over a channel that comprises multiple propagation paths or "multipaths" between the transmitter and the receiver. These multipaths are caused by the reflection of the transmitted signal from hills, buildings, airplanes, discontinuities in the atmosphere, and the like. As the result of multipaths, the signal received by the receiver consists of multiple components that vary in both phase and amplitude.

The complex addition of these multiple components at the receiver results in a phenomenon known as fading, wherein the phase and amplitude of the received signal varies with time. Thus, at any given time, the state of the channel between the transmitter and the receiver can be described generally by the amplitude attenuation and phase shift caused by the channel. These channel characteristics can significantly affect the ability of a wireless receiver to determine the phase and amplitude of the transmitted signal, and can thus impair the ability of the receiver to decode the transmitted symbols. This impairment is particularly significant when the receiver encounters "deep fades," which are periods of significant signal attenuation caused by the destructive addition of multipath components.

Because cellular receivers are typically moving during reception, the duration and rate of fading observed by a receiver is a function of the speed of the mobile receiver. This is because the landscape characteristics change as the mobile unit changes place, so that different reflections are observed.

Since fading is continuous (that is, it is likely to be observed over several adjacent transmitted data symbols), the inner interleaver 1122 is used to separate several adjacent faded symbols. This method is particularly beneficial in trellis coded systems since the trellis decoder makes decisions based upon path probability over several symbols. When a deep fade occurs, the probability that an entire path length of symbols will be decoded erroneously is much higher. In order to prevent the erroneous detection of an entire path of symbols, interleaving is performed to spread the effects of fading.

The depth of the inner interleaver 1122 is chosen on the order of the anticipated maximum duration of fade. By interleaving symbols according to this method, a group of symbols which are normally transmitted together over the duration of a single fade are separated so that the effect of the fade is less concentrated and pronounced in one portion of the signal sequence. In this manner, the memory in the channel (i.e., the systematic predictable effects such as Rayleigh fading which occur over a continuous duration) is reduced or eliminated for practical purposes. One commonly employed rule of thumb for calculating the depth of the inner interleaver 1122 requires that the maximum expected doppler frequency times the symbol duration times the depth of the inner interleaver 1122 is greater than 0.2. The well known formula used to calculate the doppler frequency is $f_d = (V \ast f_c)/C$ where $f_d$ is the doppler frequency, V is the velocity of the mobile unit, $f_c$ is the carrier frequency, and C is the speed of light. In one embodiment, the minimum speed at which the mobile unit is to operate with reasonable error performance is assumed to be 8 Km/hr and the symbol duration is approximately 0.04 ms. According to the above mentioned criteria, the depth of the inner interleaver 1122 must be greater than 810 channel symbols. However, as is well known in the art, delay constraint factors are also considered when determining the dimensions of the inner interleaver 1122. Briefly, whenever interleaving is performed, a delay is produced in the transmission of data. Many applications are unable to tolerate large delays. Therefore, many communication systems impose a delay constraint. Consequently, the depth of the interleaver cannot be indefinitely large. In one preferred embodiment, the depth of the inner interleaver is chosen to be 252 channel symbols to meet delay constraint criteria.

The span of the inner interleaver 1122 is related to the trellis decoder buffer size which is a function of the constraint length of the code. In one preferred embodiment, the interleaving span is chosen to be 10 symbols. The resulting total interleaving delay for both the inner and outer interleavers 1115, 1122 is approximately 100 milliseconds.

Figure 12:
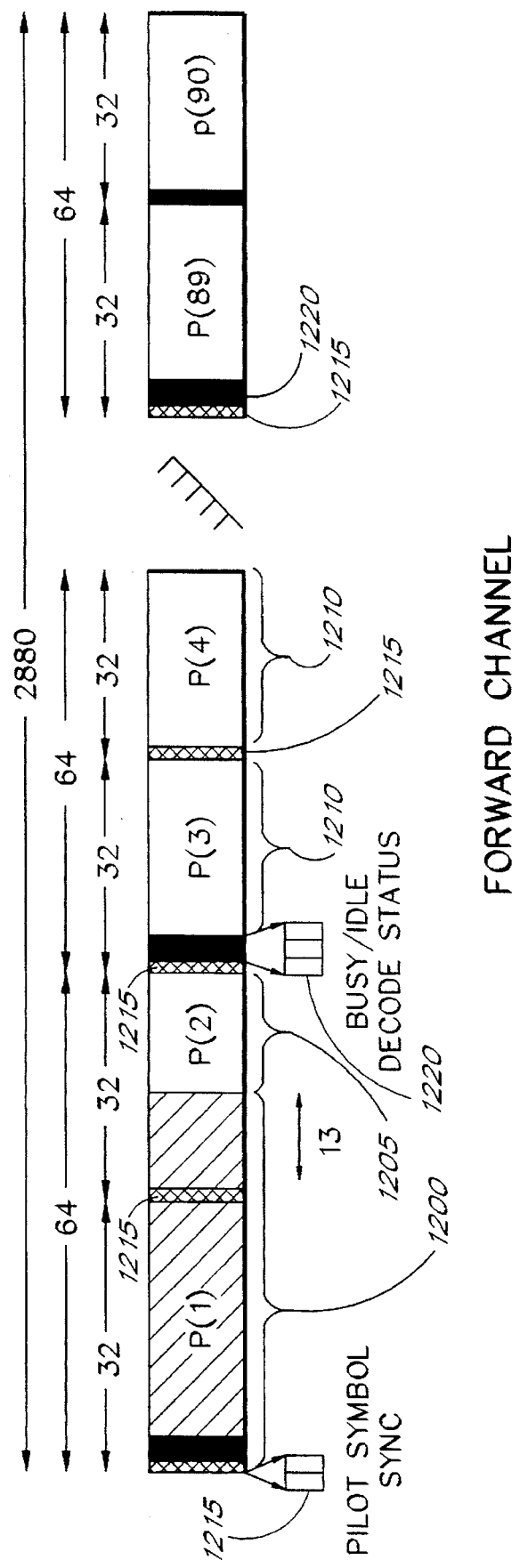
FIG. 12 is a schematic representation of the main elements of the forward channel signal stream transmitted from the transmitter of FIG. 11A to the receiver of FIG. 11B.
Figure 13:
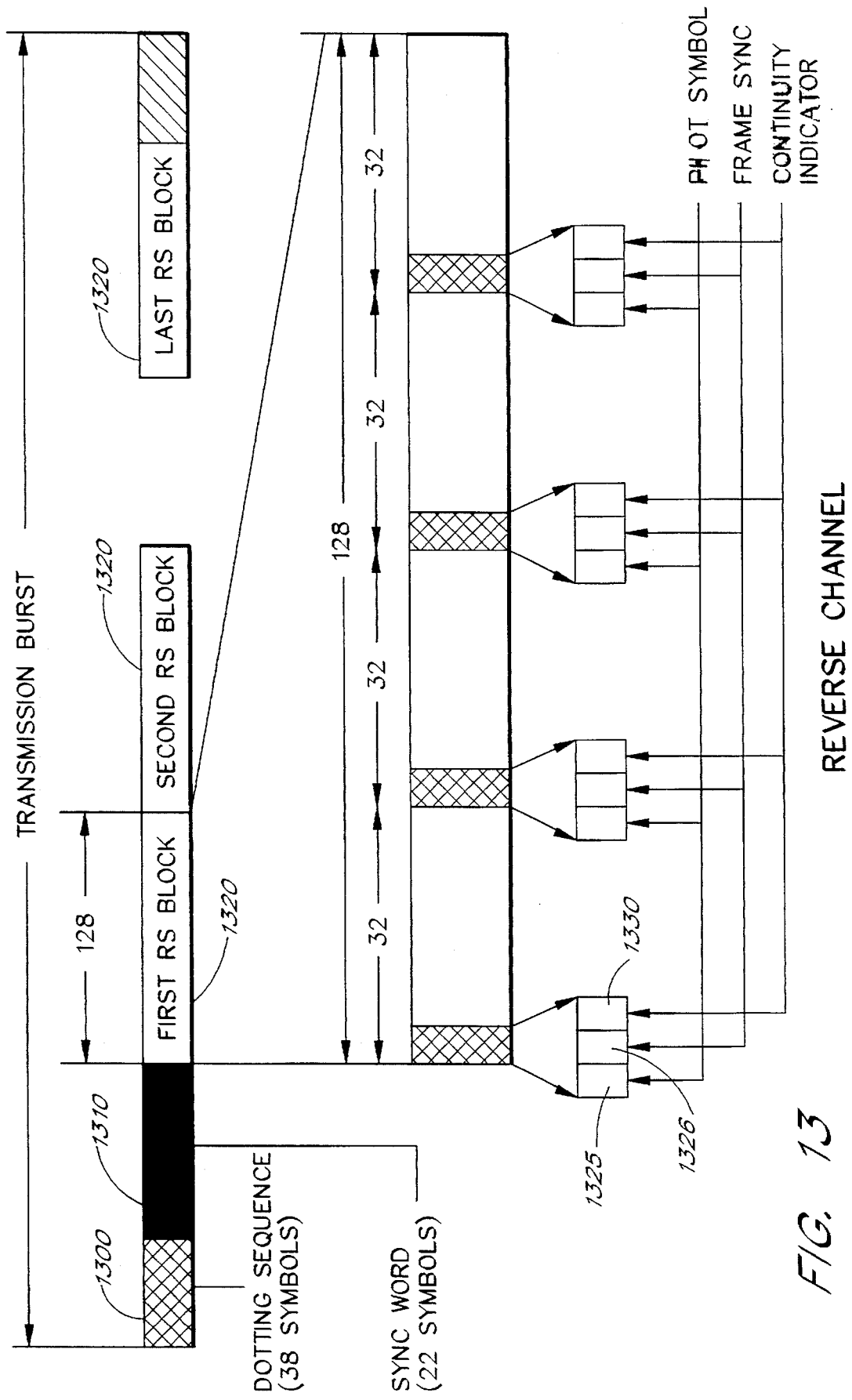
FIG. 13 is a schematic representation of the reverse channel frame format for the communication system of FIGS. 11A and 11B.

Once trellis coding and interleaving operations have been performed, a frame synchronization sequence as well as a pair of differential pilot words are inserted into the signal by the frame synchronization inserter 1125 and the pilot word inserter 1128, respectively. Extra symbols for the purpose of frame synchronization, pilot word insertion, transmission of the busy/idle status of the reverse channel and transmission of the status of the Reed-Solomon decoder are embedded within a frame of data as shown in FIGS. 12 and 13. FIG. 12 shows the forward channel frame format, and FIG. 13 shows the reverse channel frame format. The forward channel is defined as the channel used to transmit data from a base station to various mobile units. The reverse channel is the channel shared by many mobile units to transmit information to a base station.

For the forward channel format depicted in FIG. 12, the frame synchronization sequence occurs at the beginning of the transmission, and includes a series of synchronization symbols. As will be discussed later, synchronization may be obtained by means of a sliding correlator circuit. As shown in FIG. 12, one sub frame, together with 13 symbols of an additional sub-frame of synchronization data 1200 is followed by a 19-symbol partial sub-frame of data 1205 and 88 full sub-frames of data 1210. Each data sub-frame 1210 includes 32 symbols beginning with a differential pilot signal pair 1215. Every other sub-frame (i.e., every odd sub-frame) includes three busy/idle, decode status symbols 1220. After the initial pilot signal pair 1215 and the busy/idle, decode status symbols 1220, channel data follows.

The differential pilot signal pair 1215 allows for channel fading compensation and rapid synchronization of the data signal, while the busy/idle decode, status symbols 1220 provide information concerning the status of the reverse channel. In one preferred embodiment, the pilot signals have a constant difference. In such an embodiment, the receiver side 1108 is equipped with a differential detector which is set to detect the known difference between the pilot signal pair. Since the symbols are adjacent, these symbols undergo substantially the same distortions through the communication medium so that, although both pilot symbols may be distorted, the difference between the pilot symbols remains constant. Thus, this difference can be detected at the receiving end with little difficulty. Furthermore, since the pilot signals come at known periods (e.g., every 32 symbols in one embodiment), the detection of the pilot signal difference can be used as a means of synchronizing the timing rate of the data stream.

Figure 15:
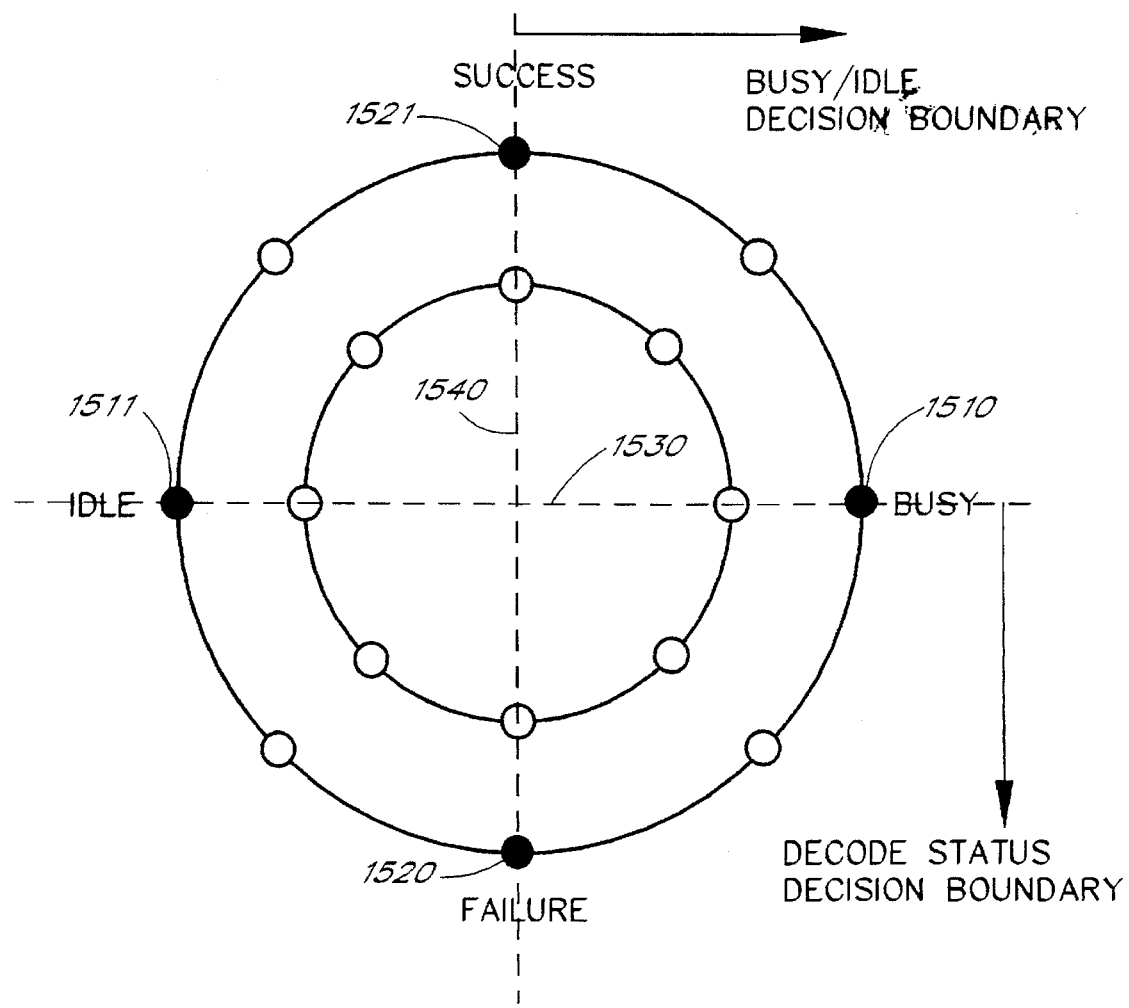
FIG. 15 illustrates the 16 Star QAM constellation assignments for the busy/idle and decode status symbols transmitted over the forward channel.

The busy/idle symbols are transmitted across the forward channel by the base station to indicate whether the reverse channel is busy. The decode status symbol is transmitted across the forward channel by the base station to indicate whether the last Reed-Solomon block received from the mobile unit was successfully decoded. FIG. 15 illustrates the points on the 16 Star QAM signal constellation to which the busy/idle and decode status symbols 1120 are assigned.

During transmission the busy/idle symbol (of the busy/idle/decode status symbols 1220 depicted in FIG. 12) is assigned to the signal represented by either the point 1510 or the point 1511 of the signal constellation depicted in FIG. 15. If the busy/idle symbol is assigned to the point 1510, this indicates that the reverse channel is busy; while if the busy/idle symbol is assigned to the point 1511, this indicates that the reverse channel is idle. It should be understood that in one preferred embodiment, two adjacent busy/idle symbols are transmitted having the same value to protect against channel errors. Since the busy/idle symbols are transmitted periodically, the receiver can locate the busy/idle symbols in the received signal sequence.

Once the busy/idle symbols have been located, the receiver at the mobile unit adds the two adjacently received busy/idle symbols (that is, adds the vectors corresponding to the received busy/idle symbols by means of well known vector addition methods). The x-component (also called the in-phase component, which is the component along line 1530) of the sum of the two busy/idle vectors is observed. If this component is positive (i.e., to the right of line 1540 in FIG. 15), then the mobile unit decides that the reverse channel is busy. If the in-phase component of the sum of the received busy/idle vectors is negative (i.e., to the left of the line 1540 in FIG. 15) then the mobile unite decides that the reverse channel is idle.

The decode status symbol of the forward channel transmission sequence is assigned to either the point 1520 or the point 1521 on the signal constellation depicted in FIG. 15. If the decode status symbol is assigned to the point 1520, this indicates that the base station has failed to decode the information within the last Reed-Solomon block correctly. If the decode status symbol is assigned to the point 1521, this indicates that the base station has successfully decoded the information within the last Reed-Solomon block. When the decode status symbols have been located, the receiver at the mobile unit adds the vectors corresponding to two successively received decode status symbols. The y-component (also called the quadrature component, which is the component along the line 1540) of the sum of the two decode status vectors is observed. If this component is positive (i.e., above the line 1530 in FIG. 15), then the mobile unit decides that the base station has successfully decoded the last Reed-Solomon block. If the quadrature component of the sum of the received decode status vectors is negative (i.e., below the line 1530 in FIG. 15) then the mobile unit determines that the base station has failed to correctly decode the information in the last Reed-Solomon block.

As represented in FIG. 13, for transmission across the reverse channel, a 38-symbol dotting sequence 1300 is followed by a 22-symbol SYNC word 1310. The SYNC word 1310 is followed by a series of Reed-Solomon encoded data blocks 1320 which each contain 128 symbols, as shown in the enlarged depiction of the first Reed-Solomon block 1320. Each block 1320 comprises four 32-symbol segments which each begin with a differential pilot word. The differential pilot word comprises a pilot symbol 1325 and a frame SYNC symbol 1326. In addition, a continuity indicator symbol 1330 is included at the beginning of every 32-bit segment.

After the frame synchronization sequence and the differential pilot signal pair have been inserted, the data signal enters the 16 Star QAM mapper 1130. The 16 Star QAM mapper may be implemented as a signal mapping look-up table which assigns each of the 16 possible output values to a point on the 16 Star QAM signal constellation in accordance with the Gray coding scheme shown in FIG. 10. That is, the output symbol applied to the input of the 16 Star QAM mapper look-up table 1130 is used to determine the amplitude and phase of the encoded symbol. In this way the phase and amplitude coordinates corresponding to each channel symbol are assigned by the 16 Star QAM mapping look-up table 1130.

Once the signal has been mapped within the mapper 1130, the signal is filtered by the Nyquist pulse shaping filter 1133, which is a baseband filter. The filtering ensures that the data transmission is limited to a 30 KHz bandwidth with no intersymbol interference. The pulse shaping is advantageously performed by a square root raised cosine pulse filter, as is commonly used in the art. In one embodiment, the pulse filter has a roll-off factor of 0.35. That is, if substantially all the transmission power is to be restricted to a 30 KHz bandwidth, the available transmission bandwidth is 30 KHz/(1+0.35), as will be understood in the art.

Once filtering has taken place, the symbols are then modulated and amplified in the RF transmitter 1135, and sent to the antenna 1136 for transmission over the communication medium to the receiver side 1108.

At the receiver side 1108 of the mobile communication system 1100, the antenna 1140 receives the radio signal sent by the transmitter side 1105 and forwards the received signal to the RF receiver 1142. The RF receiver 1142 converts the RF signal to baseband frequency. The basband signal enters the complex multiplier 1144 where the signal is multiplied by a sinusoidal waveform generated by the oscillator/controller 1158. The signal from the oscillator/controller 1158 is used to correct the phase shift introduced into the transmitted data signal over the communication medium. The waveform generated by the oscillator/controller 1158 is the inverse of the average phase shift introduced in the carrier over the channel. The average phase shift is determined within the channel estimator 1168, as discussed further below. The complex multiplier 1144 combines the incoming signal having a phase shifted carrier frequency with the inverse phase shift signal generated by the oscillator/controller 1158 to output a signal having the original carrier frequency. Once the baseband data signal and the generated sinusoidal waveform have been multiplied to correct for phase shifting errors, the phase compensated signal enters the Nyquist pulse shaping filter 1145.

The pulse shaping filter 1145, which is a baseband filter, removes high frequency noise and adjacent channel interference introduced over the communication medium. The filter 1145 is also a square root raised cosine filter which, in one embodiment has a roll-off factor of 0.35. The filter 1145 combines with the filter 1133 to form a first power (i.e., a half power combined with a half power) raised cosine filter.

The filtered signal enters the equalizer filter 1148. The equalizer filter 1148 is a standard adaptive linear equalizer which uses channel state and symbol timing feedback information for adaptation purposes. That is, the equalizer filter 1148 removes delay spread from multiple reflections of the same signal received by the receiver. Well known methods such as feed-back decision directed equalization, maximum likelihood equalization, etc. may be used in accordance with the teachings of the present invention. More specifically, the equalizer filter 1148 receives inputs from the equalizer estimator 1152. The equalizer estimator 1152 outputs information relating to the timing of the incoming data stream, which the equalizer estimator receives from the symbol timing recovery circuit 1150. The equalizer estimator 1152 also outputs information to the equalizer filter 1148 relating to the distortions observed over the communication medium. This information is received by the equalizer estimator 1152 as feedback from the pilot word extraction circuit 1164, as will be discussed in greater detail below. Finally, the equalizer estimator 1152 outputs information relating to the channel state to the equalizer filter 1148.

The equalizer estimator 1152 receives channel state information as feedback from the channel estimator 1168. Using the data input from the equalizer estimator 1152, the equalizer filter 1148 sets filtering parameters in order to compensate for distortion introduced to the signal during transmission over the communication medium.

The equalized signal is output to both the symbol timing recovery circuit 1150 and the sampler 1160. The symbol timing recovery circuit uses the filtered and equalized signal to extract signal timing from the incomming data signal. This signal timing is then used as input to the sampler circuit 1160 to extract data caried on the signal. The sampler 1160 digitally samples the incoming signal at a frequency determined by the symbol timing recovery circuit 1150. This sampling rate is sufficient to satisfy Nyquist requirements (e.g., 4 samples are taken per channel symbol in one embodiment). This sampling rate is appropriate to recover the channel symbol with minimum inter-symbol interference.

The sampled signal serves as inputs to both the pilot word extraction circuit 1164 and the frame synchronization extraction circuit 1166. Frame synchronization and pilot word extraction are performed by sliding correlators, a technique which is well known in the art. In the case of the frame synchronization extraction circuit 1166, the sliding correlator has a memory which stores a reference frame synchronization pattern which matches the transmitted frame sync pattern. When the reference pattern within the frame synchronization extraction circuit 1166 is adjusted (or slid) so that it substantially has the same timing as the incoming synchronization pattern, a high correlation is observed between the incoming signal and the reference pattern. The maximum correlation between the reference pattern and the incoming signal is used to determine the frame synchronization.

In the case of the pilot word extraction circuit 1164, the sliding correlator has a memory which stores a reference differential signal which matches the difference between the pilot signals (see FIG. 12). The pilot signal extraction circuit 1164 includes a differentiator which is able to detect the differences between pairs of symbols. As discussed above with reference to FIG. 12, the pilot signal pairs are chosen to have a constant difference between them. Therefore, since the pilot channel symbols are adjacent to one another during transmission and undergo substantially the same distortion during transmission, the difference between the pilot signal pair remains substantially unaffected during transmission. This determined difference between the incoming pairs of data symbols is compared to and correlated with the reference differential signal by adjusting (sliding) the reference signal along the incoming data stream. Once a high correlation is observed between the reference signal and the incoming data stream, this is an indication that the pilot signal pair has been detected. The pilot word extraction circuit 1164 then extracts the symbols identified as the pilot symbols.

Information extracted from the pilot signals is also fed as an input into the channel estimator 1168. The channel estimator 1168 uses these symbols to interpolate the phase and amplitude distortions which the signal has experienced during transmission through the communication medium. Since the receiver has information relating to the exact expected phase and amplitude of the pilot symbol, and since the receiver has information relating to the phase and amplitude of the actually received signal, an estimation of the phase and amplitude distortions introduced over the communication channel can be made. The complex conjugate of this signal can then be used to multiply the incoming signal to compensate for distortions introduced over the communication medium. The channel estimator 1168 outputs the phase distortion information to the digital numerically controlled oscillator/controller 1158. The oscillator/controller 1158 uses these inputs to control the oscillation frequency by methods well understood in the art.

The channel estimator 1168 also outputs a signal which is the complex conjugate of the estimated channel phase (i.e., conjugate of the phase distortion introduced by the communication medium). This complex conjugate signal is multiplied by the received signal in the multiplier circuit 1162. Multiplying the received signal by the conjugate of the channel phase compensates for the phase distortions introduced by the channel phase, as described above.

Information relating to the amplitude distortions introduced over the communication medium is passed from the channel estimator 1168 to the trellis decoder 1175 via the inner deinterleaver 1170. The inner deinterleaver 1170 deinterleaves the phase compensated in-phase and quadrature components of the baseband signal together with the corresponding channel state information provided by the channel estimator 1168. Once inner deinterleaving has taken place, the trellis decoder 1175 performs maximum likelihood decoding of the sequence through soft decision Viterbi decoding, as described above under the heading Maximum Likelihood Decoding. The structure and operation of the decoder 1175 is determined from the look-up tables represented in FIGS. 8 and 9.

The channel state amplitude distortion information is used to construct the optimum Gaussian decoding metric. The Gaussian decoding metric differs from the Euclidean coding metric in that the Gaussian decoding metric takes into account the phase shift and amplitude distortion introduced over the communication medium. Thus, the only distortion factor which remains when calculating probability distances according to Gaussian Metric is the distortion introduced by the additive white Gaussian noise (AWGN), so that a truer probability distribution of the path of the detected signal may be determined.

The trellis decoded symbols are then passed through the outer deinterleaver 1180 in order to restore their original order. The deinterleaved symbols are then passed on to the Reed-Solomon decoder 1185 which, by methods known in the art, decodes the symbols output from the trellis decoder 1175 to reconstruct the original input data.

In one particularly advantageous embodiment, the post trellis decoding information provided by the trellis decoder 1175 can also be used by the Reed-Solomon decoder 1185 to perform error and erasure decoding in order to improve performance. Basically, this involves having the trellis decoder 1175 output a likelihood value associated with each symbol to the Reed-Solomon decoder 1185. The likelihood value is a measure of the probability that each decoded symbol is correct. By having information relating to which symbols are more likely to be correctly decoded, the Reed-Solomon decoder is able to more efficiently concentrate on the symbols which should be corrected, as is well understood in the art, and hence improve the error correcting capability of the Reed-Solomon decoder 1185.

The Cyclic Trellis Encoder

Figure 14:
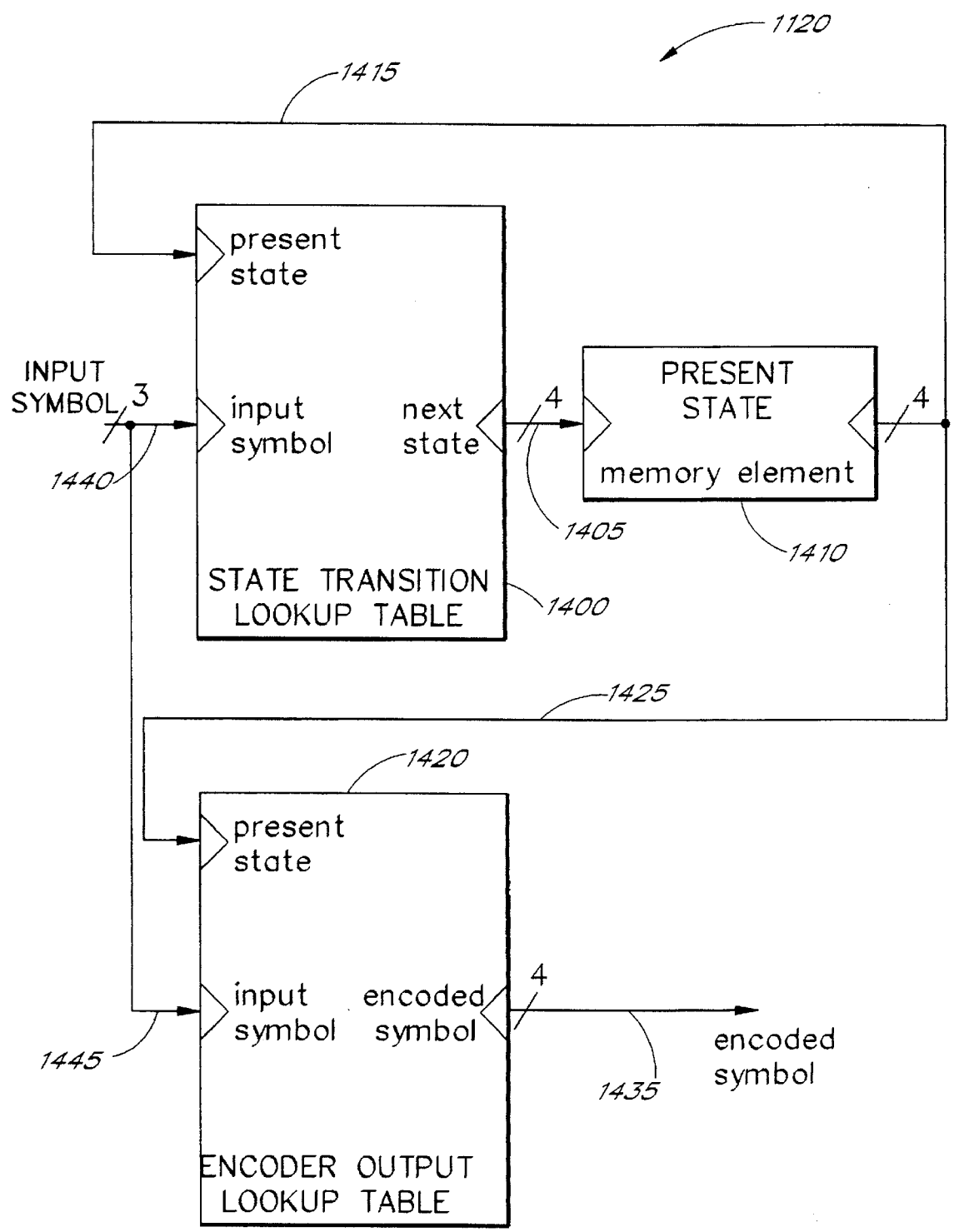
FIG. 14 is a schematic block diagram which shows the main structural and functional elements of a cyclic trellis encoder constructed in accordance with the teachings of the present invention.

FIG. 14 is a schematic block diagram which shows the main structural elements of the cyclic trellis encoder 1120 constructed in accordance with the teachings of the present invention. The encoder 1120 includes a state transition look-up table 1400, which may, for example, be fabricated from a ROM IC chip, or other means. A next state output of the state transition look-up table 1400 connects to a memory element 1410 via a line 1405. The memory element 1410 may, in one embodiment, be implemented as a series of D flip-flops. The output of the memory element 1410 connects to a present state input of the state transition look-up table 1400 via a line 1415 and to a present state input of an output look-up table 1420 via a line 1425. The output look-up table 1420 outputs an encoded symbol via a line 1435. The state transition look-up table 1400 and the output look-up table 1420 receive three-bit input symbols via lines 1440, 1445, respectively.

In operation, the three-bit input symbol enters the state transition look-up table 1400. In addition, the present state of the encoder, which is supplied by the memory element 1410, is applied to the present state input of the state transition look-up table 1400. Given the present state and the three-bit input signal, the state transition table 1400 outputs a next state value over the line 1405. The state transition look-up table 1400 is implemented so that the next state value generated by the state transition look-up table 1400 is determined in accordance with the next state table of FIG. 9.

The next state value enters the memory element 1410 where the next state value is stored for one input cycle. That is, upon application of the next three-bit input signal, the next state value which was applied to the input of the memory element 1410 is passed to the output of the memory element 1410. Thus, the output of the memory element 1410 corresponds to the present state of the trellis encoder 1120.

The present state value at the output of the memory element 1410 is applied to the inputs of both the state transition look-up table 1400 and the encoder output look-up table 1420. The output look-up table 1420 receives the present state input via the line 1425 and the input symbol via the line 1445, and generates an encoded four-bit output symbol. The output table 1420 is implemented so that the output value generated by the output look-up table 1420 is determined in accordance with the output table of FIG. 8. This output value is an encoded output symbol which serves as the output of the encoder 1120.

While various embodiments of the system and method of the present invention have been described, it should be understood that these embodiments have been presented by way of example only, and are not intended to limit the scope of the present invention. For example, although the preceeding description refers to transmission of data over cellular mobile radio, the system of the present inveniton can also be used in accordance with wire-line data transmission. Thus, the breadth and scope of the present invention should be defined only in accordance with the following claims and their equivalents.

We claim:

1. A wireless communication system for transmission of signals mapped according to 16 star QAM modulation scheme, said communication system comprising:

a transmitting circuit, said transmitting circuit comprising:
   a Reed-Solomon (63,53) block encoder;
   an outer block interleaver coupled to said Reed-Solomon encoder;
   a rate ¾ trellis encoder coupled to said outer interleaver;
   an inner block interleaver coupled to said trellis encoder;
   a frame synchronization insertion circuit coupled to said inner interleaver;
   a pilot word insertion circuit coupled to said frame synchronization insertion circuit;
   a 16 star QAM mapper coupled to said pilot word insertion circuit;
   a first baseband filter coupled to said 16 star QAM mapper; and
   a transmitter coupled to said filter; and;

a receiver circuit, said receiver circuit comprising:
   a receiver;
   a second baseband filter coupled to to said receiver;
   an equalizer filter which receives input from said second baseband filter, said equalizer filter also receiving input from an equalizer estimator circuit;
   a symbol timing recovery circuit coupled to receive input from said second baseband filter and to provide outputs to said equalizer estimator circuit and to a sampler circuit;
   an automatic frequency control circuit which receives input from said equalizer filter, and provides output to said sampler, said frequency control circuit further receiving input from an oscillator circuit;
   a pilot word extraction circuit and a frame synchronization extraction circuit which receive inputs from said sampler,
   a channel estimator circuit which receives input from said pilot word extraction circuit and provides control outputs to said oscillator circuit and said equalizer estimator;
   a multiplier circuit which receives inputs from said sampler and said channel estimator;
   an inner deinterleaver circuit which receives inputs from said multiplier circuit, said frame synchronization extraction circuit, and said channel estimator circuit;
   a trellis decoder circuit coupled to said inner deinterleaver;
   an outer deinterleaver coupled to said trellis decoder; and
   a Reed-Solomon decoder coupled to said outer deinterleaver.

2. A mobile radio communication system, comprising:

a trellis encoder which receives data and trellis encodes said data;

a 16 star QAM mapper coupled to said trellis encoder and configured to encode data from said trellis encoder and to map said encoded data into a 16 star QAM signal constellation;

a transmitter configured to accept the encoded and map data and to transmit said encoded and mapped data over a communication channel;

a receiver configured to receive the transmitted data from said communication channel;

a trellis decoder coupled to said receiver; and an inner interleaver coupled between said trellis encoder and said 16 star QAM mapper and an inner deinterleaver coupled between said radio frequency receiver and said trellis decoder.

3. A communication system as defined in claim 2, further comprising a frame synchronization insertion circuit between said inner interleaver and said 16 star QAM mapper.

4. A communication system as defined in claim 3, further comprising a pilot word insertion circuit between said frame synchronization insertion circuit and said 16 star QAM mapper.

5. A communication system as defined in claim 4, wherein said pilot word insertion circuit inserts a differential pilot word comprising at least two adjacent pilot channel symbols.

6. A communication system as defined in claim 5, further comprising a feedback controlled equalizer filter, a sampler circuit, a pilot word extraction circuit and a frame synchronization extraction circuit coupled between said radio frequency receiver and said inner deinterleaver.

7. A mobile radio communication system, comprising:
- a trellis encoder which receives data and trellis encodes said data;
- a 16 star QAM mapper coupled to said trellis encoder and configured to encode data from said trellis encoder and to map said encoded data into a 16 star QAM signal constellation;
- a transmitter configured to accept the encoded and map data and to transmit said encoded and mapped data over a communication channel;
- a receiver configured to receive the transmitted data from said communication channel;
- a trellis decoder coupled to said receiver; and
- a pilot word insertion circuit coupled between said trellis encoder and said 16 star QAM mapper.

8. A communication system as defined in claim 7, wherein said pilot word insertion circuit inserts a differential pilot word comprising at least two adjacent pilot channel symbols.

9. A method of rate ¾, cyclic trellis encoding a 16 star QAM signal by means of a 16-state cyclic trellis encoder, said method comprising the steps of:
- receiving a three-bit input signal which is to be encoded into a four-bit output signal, said three-bit input signal corresponding to eight possible input values and said four-bit output signal corresponding to 16 possible output values;
- compiling an output look-up circuit wherein said 16 possible output values are defined as a function of said eight input values and 16 present states of said cyclic trellis encoder, said output table outputting consecutively increasing even output values upon the application of consecutively increasing input values while in an even present state, and said output table outputting consecutively increasing odd output values upon the application of consecutively increasing input values while in an odd present state;
- compiling a state transition look-up circuit wherein 16 next state values of said cyclic trellis encoder are defined as a function of said eight input values and said 16 present states of said cyclic trellis encoder, said state transition circuit outputting the first eight consecutive next state values upon consecutive application of said eight input values when in a first even present state, and outputting next state values which are cyclicly shifted by one value from the next state values defined for the immediately previous even present state value upon application of said eight consecutive input values for consecutively increasing even present state values, and said state transition circuit outputting the second eight consecutive next state values upon consecutive application of said eight input values when in a first odd present state, and outputting next state values which are cyclicly shifted by one value from the next state values defined for the immediately previous odd present state value upon application of said eight consecutive input values for consecutively increasing odd present state values;
- applying said three-bit input signal to an input of said state transition circuit, thereby generating a next state value;
- storing said next state value over the duration of one input cycle until said stored next state value becomes a present state value;
- applying said present state value to an input of said output look-up circuit while simultaneously applying said three-bit input signal to another input of said output look-up circuit, thereby generating one of said 16 possible output values; and
- assigning a phase and amplitude coordinate in a 16 star QAM signal constellation to each of said output values generated by said output look-up circuit.

* * * * *

UNITED STATES PATENT AND TRADEMARK OFFICE
CERTIFICATE OF CORRECTION

PATENT NO. : 5,659,578
DATED : August 19, 1997
INVENTOR(S) : Alamouti et al.

It is certified that error appears in the above-indentified patent and that said Letters Patent is hereby corrected as shown below:

Column 9, line 54, replace "trellis pat" with --trellis paths--.

Signed and Sealed this

Twenty-seventh Day of October, 1998

Attest:

BRUCE LEHMAN

Attesting Officer

Commissioner of Patents and Trademarks